United States Patent
Katsumata et al.

(10) Patent No.: US 9,174,524 B2
(45) Date of Patent: Nov. 3, 2015

(54) CONTROL DEVICE AND CONTROL METHOD FOR ELECTRIC MOTOR VEHICLE

(75) Inventors: Yuji Katsumata, Atsugi (JP); Kengo Fujiwara, Ebina (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 224 days.

(21) Appl. No.: 13/258,145

(22) PCT Filed: Apr. 9, 2010

(86) PCT No.: PCT/JP2010/056796
§ 371 (c)(1),
(2), (4) Date: Sep. 21, 2011

(87) PCT Pub. No.: WO2010/134402
PCT Pub. Date: Nov. 25, 2010

(65) Prior Publication Data
US 2012/0016549 A1 Jan. 19, 2012

(30) Foreign Application Priority Data

May 22, 2009 (JP) .................................. 2009-124290
Feb. 10, 2010 (JP) .................................. 2010-027964

(51) Int. Cl.
*B60K 6/46* (2007.10)
*B60L 15/20* (2006.01)
(Continued)

(52) U.S. Cl.
CPC . *B60K 6/46* (2013.01); *B60L 15/20* (2013.01); *B60W 10/08* (2013.01); *B60W 30/20* (2013.01);
(Continued)

(58) Field of Classification Search
CPC ......... B60K 6/46; B60L 15/20; B60W 10/08; B60W 30/20
USPC ................... 701/22, 36, 48, 69, 81; 180/65.1, 180/65.245, 65.29, 65.51; 290/7, 9, 16, 50; 903/906
See application file for complete search history.

(56) References Cited

U.S. PATENT DOCUMENTS 6,173,574 B1 * 1/2001 Obayashi et al. ............... 60/710
6,247,437 B1 * 6/2001 Yamaguchi et al. ....... 123/179.3
(Continued)

FOREIGN PATENT DOCUMENTS

CN        1772523 A       5/2006
JP     2001-45613 (A)     2/2001
(Continued)

OTHER PUBLICATIONS

Chinese Office Action, Feb. 7, 2014, 6 pages.

*Primary Examiner* — Nicholas Kiswanto
(74) *Attorney, Agent, or Firm* — Foley & Lardner LLP

(57) ABSTRACT

A vehicle comprises a drive motor (15) that generates a drive torque to be transmitted to drive wheels (18), a power supply source (12, 17) that includes, at least, a generator (12), and supplies power to the drive motor (15), and a programmable controller (20). The programmable controller (20) is programmed so as to calculate a required drive torque based upon a vehicle traveling state, calculate a power supply value representing power to be supplied from the power supply source (12, 17) to the drive motor (15) based upon the required drive torque, control the drive motor (15) to enable the drive motor (15) to output a drive torque determined by reducing a frequency component in the required drive torque, which is equivalent to torsional vibration of the drive system, and control the power supply source (12, 17) to enable the power supply source (12, 17) to supply to the drive motor (15) power obtained by reducing the frequency component in the power supply that is equivalent to the torsional vibration of the drive system.

13 Claims, 26 Drawing Sheets

(51) Int. Cl.
  *B60W 10/08* (2006.01)
  *B60W 30/20* (2006.01)
  B60K 6/34 (2007.10)
  B60W 20/00 (2006.01)

(52) U.S. Cl.
  CPC ............. *B60K 6/34* (2013.01); *B60L 2270/145* (2013.01); *B60W 20/00* (2013.01); *B60W 2510/085* (2013.01); *B60W 2710/086* (2013.01); *Y02T 10/6217* (2013.01); *Y02T 10/7275* (2013.01)

(56) References Cited

U.S. PATENT DOCUMENTS

| | | | |
|---|---|---|---|
| 6,294,854 B1 * | 9/2001 | Grosspietsch et al. | 310/92 |
| 6,408,968 B1 * | 6/2002 | Wakashiro et al. | 180/65.26 |
| 6,459,970 B2 * | 10/2002 | Goto et al. | 701/36 |
| 6,621,244 B1 * | 9/2003 | Kiyomiya et al. | 318/611 |
| 6,859,693 B2 * | 2/2005 | Tamagawa et al. | 701/22 |
| 7,058,487 B2 * | 6/2006 | Hara et al. | 701/22 |
| 7,127,337 B2 * | 10/2006 | Bennett et al. | 701/22 |
| 7,357,204 B2 * | 4/2008 | Hisada et al. | 180/65.285 |
| 7,633,257 B2 * | 12/2009 | Sakamoto et al. | 318/611 |
| 7,997,363 B2 * | 8/2011 | Mori et al. | 180/65.265 |
| 8,010,263 B2 * | 8/2011 | Morris | 701/51 |
| 8,212,505 B2 * | 7/2012 | Nagashima et al. | 318/400.23 |
| 8,269,443 B2 * | 9/2012 | Imai | 318/400.23 |
| 2001/0020789 A1 | 9/2001 | Nakashima | |
| 2006/0097670 A1 | 5/2006 | Fukasaku et al. | |

FOREIGN PATENT DOCUMENTS

| | | |
|---|---|---|
| JP | 2001-251704 (A) | 9/2001 |
| JP | 2005-151797 (A) | 6/2005 |
| JP | 2007-282440 (A) | 10/2007 |

* cited by examiner

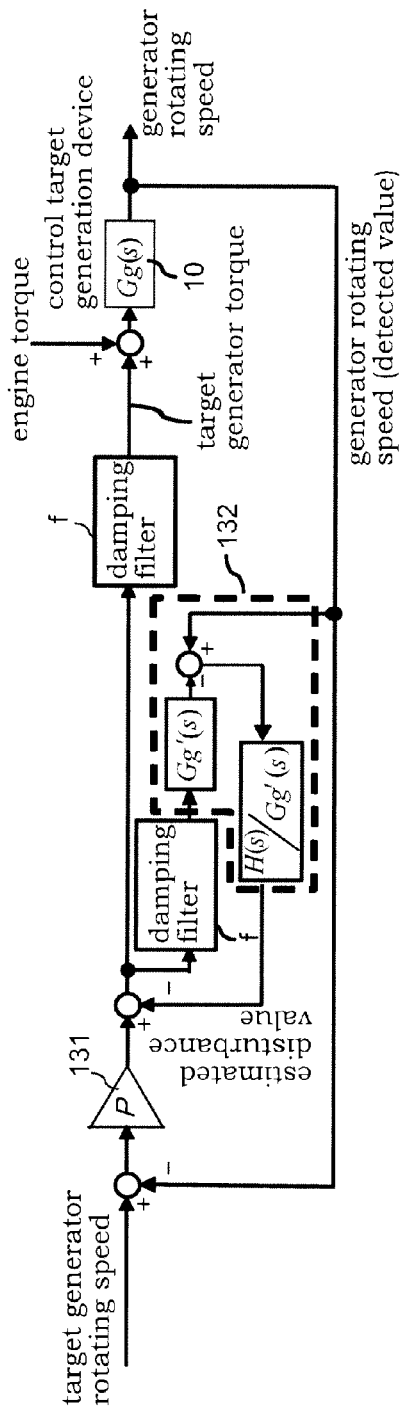
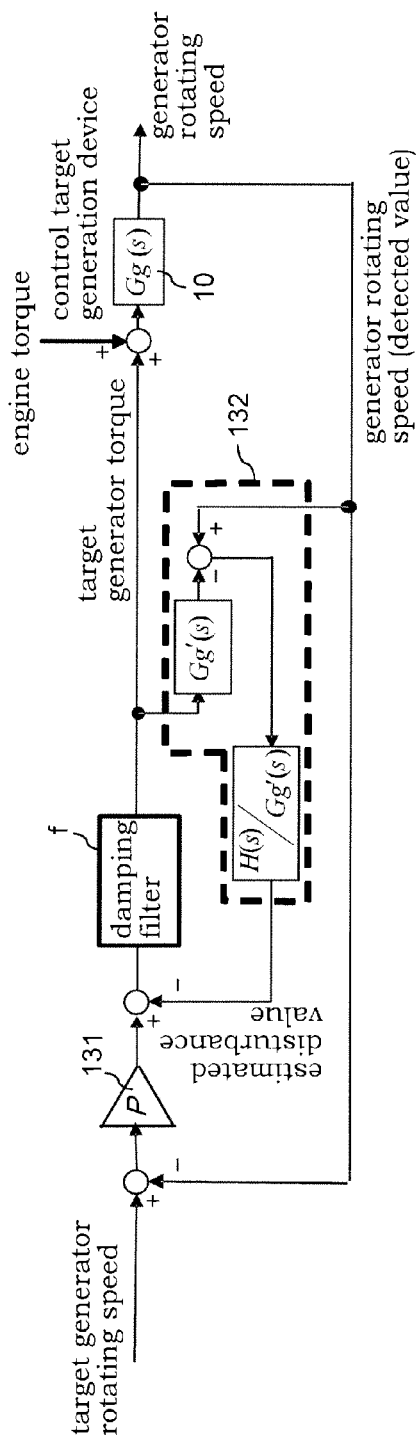
FIG. 10A
FIG. 10B

CONTROL DEVICE AND CONTROL METHOD FOR ELECTRIC MOTOR VEHICLE

TECHNICAL FIELD

This invention relates to control of an electric motor vehicle driven with a drive motor that uses electric power provided from a power supply source as a drive source thereof.

BACKGROUND ART

The electric motor vehicle control device disclosed in JP2001-45613A calculates a target drive torque by filtering a requested drive torque, calculated for a drive motor based upon the degree of accelerator pedal operation, the vehicle speed or the like, so as to remove or reduce the natural vibration frequency component inherent to torsional vibration occurring in the vehicle drive system. The device then controls an electric current flowing at the drive motor so that the drive motor torque matches the target drive torque.

Under this control, smoother creep running is achieved by inhibiting the hunting phenomenon that tends to occur when idling forward due to torsional vibration in the drive system and smoother acceleration is also achieved whenever the driver steps on the accelerator pedal and the vehicle picks up speed.

SUMMARY OF INVENTION

Under the control executed by the electric motor vehicle control device disclosed in JP2001-45613A, power is consumed at the drive motor based upon the target drive torque calculated by filtering the requested drive torque as described above. The power supply source that provides the electric power to be used to drive the drive motor, on the other hand, is controlled so as to supply power corresponding to the requested drive torque yet to undergo the filter processing. For this reason, there is a difference between the power supplied to the drive motor from the power supply source and the drive power consumed at the drive motor. This power difference gives rise to a concern that the differential power flowing toward the storage battery as charging power may result in unintended charging of the storage battery.

Accordingly, it is an object of this invention to allow electric power provided from a power supply source in a vehicle, driven by a drive motor using the electric power provided from the power supply source as a motive power source thereof, to be used in its entirety as drive power at the drive motor while inhibiting torsional vibration of a drive system.

The electric motor vehicle control device for an electric vehicle according to this invention comprises a drive motor that generates a drive torque to be transmitted to drive wheels and a power supply source that includes, at least, a generator and provides electric power to the drive motor. It further comprises a required drive torque calculation means for calculating a required drive torque based upon a vehicle traveling state and a power supply calculation means for calculating a value indicating power supply from the power supply source to the drive motor based upon the required drive torque having been calculated by the required drive torque calculation means. It further comprises a drive torque command means for controlling the drive motor so as to output a drive torque resulting from damping processing executed to reduce a frequency component in the required drive torque, which is equivalent to torsional vibration occurring in a drive system of the vehicle and a power supply command means for controlling the power supply source so as to provide power resulting from damping processing executed to reduce a frequency component in the power supply equivalent to the torsional vibration occurring in the drive system of the vehicle, to the drive motor.

Further details, characteristics and advantages of this invention will be explained in the following description by referring to the attached drawings.

BRIEF DESCRIPTION OF DRAWINGS

FIGS. 10A and 10B are block diagrams in reference to which rotating speed control executed in a second embodiment of this invention and rotating speed control executed in a variation thereof will be respectively described in detail.

DESCRIPTION OF EMBODIMENTS

Figure 1:
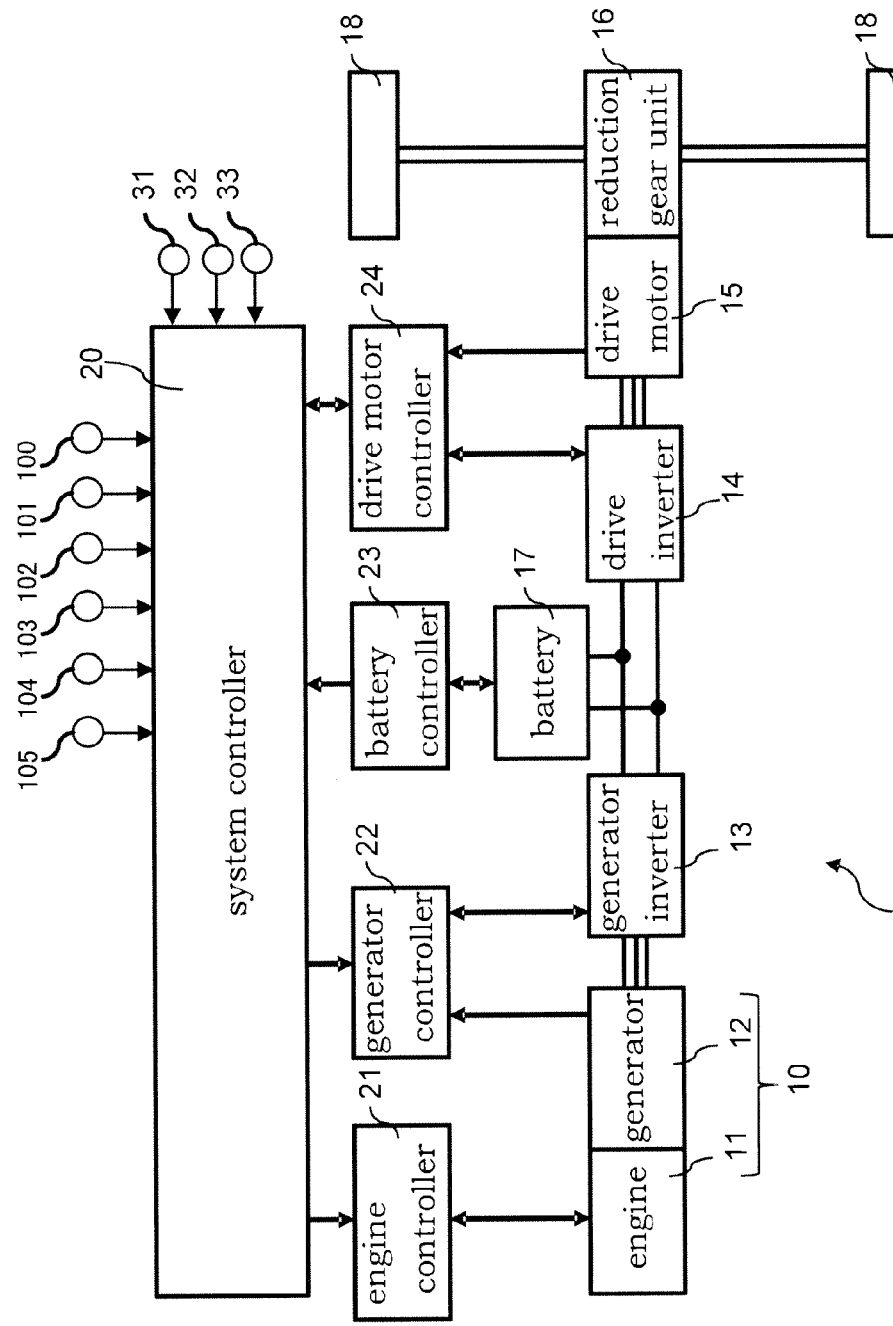
FIG. 1 is a system block diagram pertaining to the hybrid vehicle achieved in an embodiment of this invention.

As shown in FIG. 1, a hybrid vehicle 1 is a series hybrid vehicle comprising an engine 11, a generator 12, a generator inverter 13, a drive inverter 14, a drive motor 15, a reduction gear unit 16, a battery 17, drive wheels 18 and a plurality of controllers 20 to 24.

The engine 11, which may be a gasoline engine, transmits a drive power to be used to generate power to the generator 12. The engine 11 together with the generator 12 constitute a power generation device 10.

The generator 12 may be, for instance, a three-phase AC generator and functions as a power supply source that generates power as it rotates with the drive power from the engine 11 and then provides the power thus generated to the drive motor 15. In addition, the generator 12 may also operate as a motor that consumes power as the engine 11 is turned over for startup, or as the engine 11 is rotated with a drive power imparted by the generator 12.

The generator inverter 13 is constituted with a plurality of switching elements and a plurality of rectifier elements. The generator inverter 13, connected with the generator 12, the battery 17 and the drive inverter 14, converts AC power generated by the generator 12 to DC power. In addition, while the generator 12 is engaged in a motor operation, it executes reverse conversion to convert DC power provided from the battery 17 or the drive inverter 14 to AC power.

The battery 17 may be, for instance, a lithium-ion secondary battery. Regenerative power from the generator 12 is charged to the battery 17 and drive power to be used at drive the drive motor 15 is drawn from the battery 17.

The drive inverter 14 is constituted with a plurality of switching elements and a plurality of rectifier elements. The drive inverter 14 converts DC power provided from, for instance, the battery 17 or the generator inverter 13, to AC current to be supplied to the drive motor 15. In addition, it executes reverse conversion while the drive motor 15 is engaged in regenerative operation so as to convert the AC power generated via the drive motor 15 to DC power.

The drive motor 15, which may be, for instance, a three-phase AC motor, generates a drive power and transmits the drive power to the drive wheels 18 via the reduction gear unit 16. The drive motor 15 is also able to operate as a generator that regenerates deceleration energy in the vehicle 1 by generating a regenerative drive power as the rotating drive wheels 18 cause it to rotate as well while the vehicle travels.

The engine controller 21 controls the extent to which the throttle is opened at the engine 11, the ignition timing in the engine 11, the fuel supply at the engine 11 and the like, in correspondence to signals indicating a rotating speed of the engine 11 detected by a crank angle sensor 103, a cooling water temperature detected by a water temperature sensor 104 and the like, so as to achieve a target engine torque indicated in a command issued by the system controller 20.

The generator controller 22 executes switching control for the generator inverter 13 in correspondence to conditions such as the rotating speed of the generator 12 detected by a motor rotation sensor 100 or the like, a voltage at the generator 12 and the like, so as to achieve a target generator torque indicated in a command issued by the system controller 20.

The battery controller 23 estimates the state of charge (SOC) in the battery 17 based upon an electric current and a voltage charged to/discharged from the battery 17, which are respectively detected by a current sensor 101 and a voltage sensor 102, and outputs the estimated SOC to the system controller 20. In addition, the battery controller 23 calculates, through arithmetic operations, allowable input power and allowable output power in correspondence to a temperature of the battery 17 detected by a battery temperature sensor 105, an internal resistance at the battery 17 and the estimated SOC, and outputs the calculated allowable input power and allowable output power to the system controller 20.

In order to achieve a target drive torque indicated in a command issued by the system controller 20, the drive motor controller 24 executes switching control for the drive inverter 14 in correspondence to conditions of the drive motor 15 such as its rotating speed and a voltage at the drive motor 15.

Signals indicating operating conditions, such as a vehicle speed detected by a vehicle speed sensor 31, the degree of accelerator pedal operation detected by an accelerator pedal position sensor 32 and a road surface slope calculated by a level sensor, are input to the system controller 20. The system controller 20 calculates the target drive torque for the drive motor 15 based upon the SOC, the allowable input power and the allowable output power of the battery 17 reported by the battery controller 23, the power generated at the generator 12 and the like and controls, via the drive motor controller 24, the drive motor 15 so as to match the torque at the drive motor 15 with the target drive torque.

In addition, the system controller 20 calculates a target power generation value for the power generated by the generator 12 to be used to charge the battery 17 and to be provided to the drive motor 15, and controls the engine 11 and the generator 12 respectively via the engine controller 21 and the generator controller 22 so as to match the power generated at the generator 12 with the power generation target value.

The controllers 20 to 24 are each constituted with a microcomputer comprising a central processing unit (CPU), a storage device that includes a read only memory (ROM) and a random access memory (RAM), and an input/output interface (I/O interface). As an alternative, controllers 20 to 24 each constituted with a plurality of microcomputers may be used. The CPU at each of the controllers 20 to 24 executes predetermined arithmetic operation processing on a signal input to the input/output interface based upon a program installed in the ROM and read out from the ROM and outputs arithmetic operation results via the input/output interface.

Next, in reference to the flowchart in FIG. 2, operations of the system controller 20, executed to achieve direct distribution control whereby the power being generated and the drive power are made to match each other, will be described. Under the direct distribution control executed to ensure that the battery is not charged or discharged, the power generated at the generator in response to a drive request is completely used up as drive power that does not exceed or fall short of the generated power. Such direct distribution control may be executed when, for instance, the battery temperature has become low and the battery 17 cannot be charged or discharged, i.e., when both the allowable input power and the allowable output power are 0 kW.

The routine shown in the flowchart is repeatedly executed over predetermined time intervals, e.g., over 10 ms intervals, while the vehicle travels.

In a step S1, the system controller 20 calculates a requested drive torque based upon the accelerator pedal position indicating a request for a drive power from the driver and the rotating speed of the drive motor 15, and then calculates a target power generation value indicating a target power to be generated at the power generation device 10 by incorporating the loss at the drive motor 15 with the requested drive torque.

Figure 3:
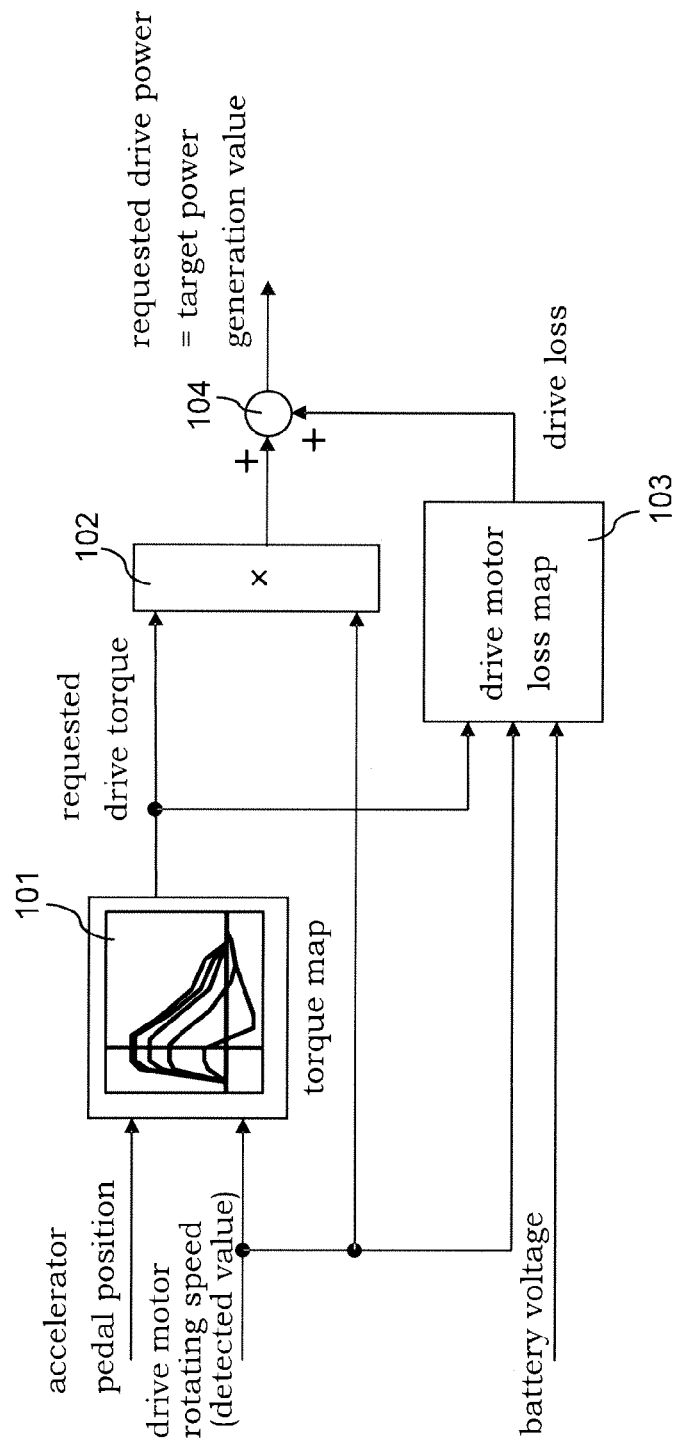
FIG. 3 is a block diagram in reference to which target power generation value calculation processing executed by the system controller will be described in detail.
Figure 4:
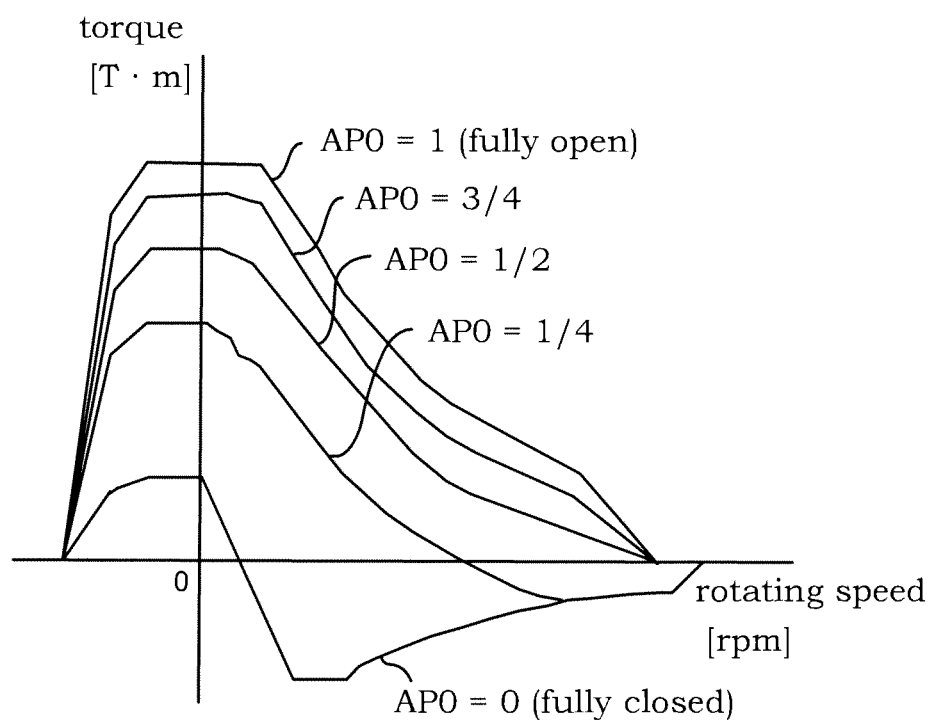
FIG. 4 shows the characteristics of a torque map stored in the system controller.

The target power generation value calculation processing will be described in detail in reference to the block diagram in FIG. 3. First, in a block 101, the system controller 20 calculates the requested drive torque by referencing a torque map shown in FIG. 4, in which relationships between the rotating speed and the output torque at the drive motor 15 are set in advance in correspondence to a plurality of accelerator pedal positions.

Next, in a block 102, the system controller 20 calculates a requested drive output by multiplying the requested drive torque by the rotating speed (detected value) of the drive motor 15. Then, in a block 103, the system controller 20 determines a drive loss by referencing a drive loss map indicating the relations of the loss at the drive inverter 14 to the rotating speed (detected value) of the drive motor 15, the requested drive torque and the battery voltage, and subsequently in a block 104, the system controller 20 calculates requested drive power by adding the drive loss to the requested drive output. The system controller 20 sets the target power to be generated under the direct distribution control equal to the requested drive power.

Figure 2:
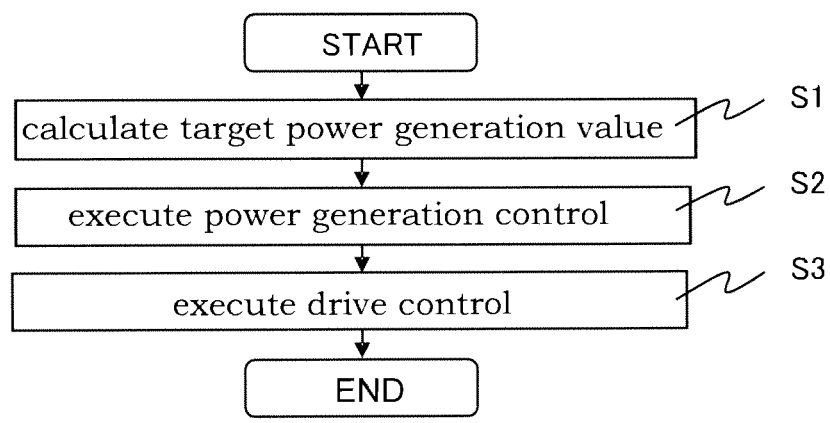
FIG. 2 is a flowchart of operations executed by a system controller in the embodiment of this invention.

To resume the description given in reference to FIG. 2, the system controller 20 controls the engine 11 and the generator 12 constituting the generation device 10 in a step S2 so as to match the target power generation value set in the step S1.

The power generation control executed in this step will be described in detail in reference to the block diagram in FIG. 5. First, in a block 111, the system controller 20 determines a target generator rotating speed and a target engine torque by referencing an operating point map set in advance, as shown in FIG. 6. The solid line in FIG. 6 is a target operation line indicating a specific relationship between the rotating speed of the generator 12 and the torque at the engine 11 set in advance by taking into consideration the fuel efficiency requirements and the required response, which needs to be achieved in order to obtain the target power through power generation. Output isograms (dotted lines) are set together with the target operation line in the operating point map. The target generator rotating speed and the target engine torque are ascertained as values corresponding to an intersecting point at which the target operation line and the output isogram corresponding to a target power generation value intersect each other.

The system controller 20 then issues a command indicating the target engine torque having been determined to the engine controller 21. In response to the command, the engine controller 21 executes torque control for the engine 11 so as to match the torque at the engine 11 with the target engine torque. Rotating speed control is executed for the generator 12 in a block 112 based upon the target generator rotating speed.

In the block 112, the system controller 20 calculates a target generator torque that will allow the rotating speed of the generator 12 to match the target generator rotating speed.

The system controller 20 filters the target generator torque calculated in the block 112 through a damping filter f, thereby calculating an ultimate target generator torque and indicates the ultimate target generator torque in a command issued to the generator controller 22. Through the damping filter f, a frequency component equivalent to a torsional vibration of the drive system in the vehicle 1 is removed or reduced. The term "torsional vibration of the drive system" is used to refer to vibration occurring as the shaft of the drive motor, the drive shaft connecting the reduction gear unit 16 to the drive wheels 18 or the like becomes twisted.

The generator controller 22 executes torque control for the generator 12 so as to match the torque of the generator 12 with the target generator torque input thereto from the damping filter f, thereby adjusting the rotating speed of the generator 12 to the target generator rotating speed.

While certain losses do occur at the generator inverter 13 and the generator 12, a power generation value representing the power generated at the generator 12 is substantially equal to a value obtained by multiplying the torque input to the generator 12 by the rotating speed of the generator 12. Accordingly, by removing or reducing the frequency component equivalent to the torsional vibration of the drive system in the target generator torque through the damping filter f and thus removing or reducing the frequency component in the rotating speed of the generator 12, the frequency component equivalent to the torsional vibration of the drive system can be ultimately removed or reduced in the power being generated.

In addition, the system controller 20 engaged in the power generation control calculates the power to be generated at the generator 12 by taking into consideration the losses occurring at the generator inverter 13 and the generator 12 based upon the target power generation value.

To resume the description given in reference to FIG. 2, the system controller 20 executes drive control, under which the power generated at the generator 12 is completely consumed at the drive motor 15 without exceeding or falling short of the generated power, in a step S3.

Figure 7:
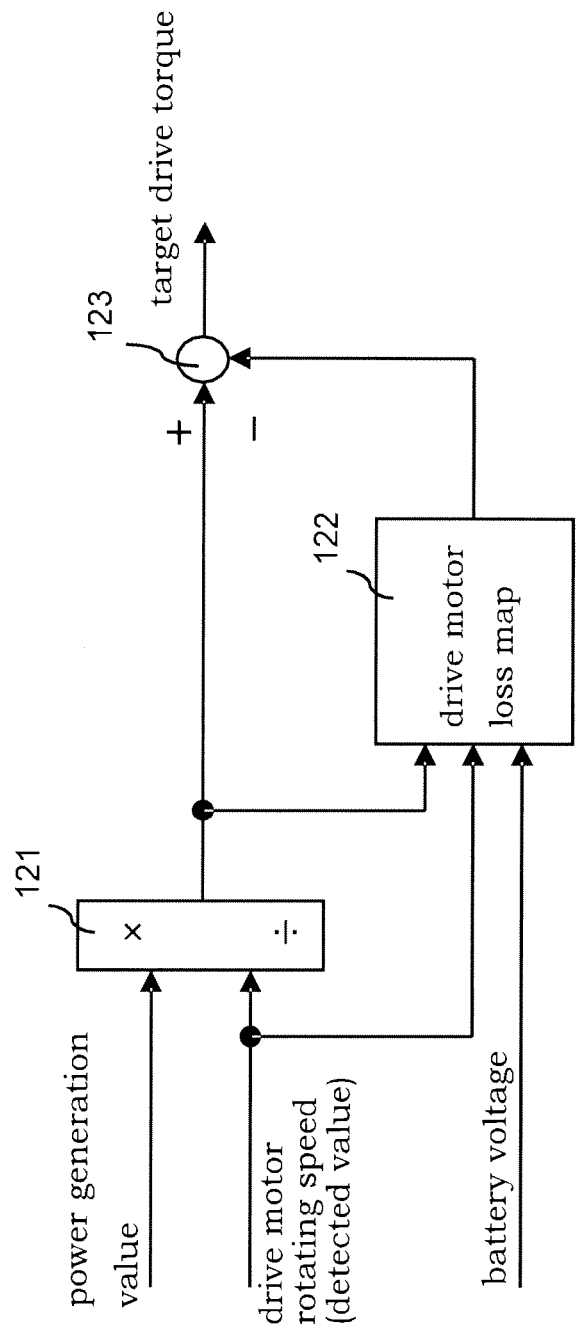
FIG. 7 is a block diagram in reference to which drive control executed by the system controller will be described in detail.

The drive control will be described in detail in reference to the block diagram in FIG. 7. In a block 121, the system controller 20 calculates the target drive torque for the drive motor 15 by dividing the power generation value having been calculated for the generator 12 in the step S2 by the rotating speed of the drive motor 15. In a block 122, the system controller 20 determines the loss at the drive motor 15 by referencing a drive motor loss map 122 set in advance based upon the rotating speed of the drive motor 15 and the battery voltage. The system controller 20 calculates an ultimate target drive torque by subtracting the loss at the drive motor 15 from the target drive torque in a block 123 and indicates the ultimate target drive torque in a command issued to the drive motor controller 24. Upon receiving the command, the drive motor controller 24 executes torque control for the drive motor 15 so as to match the torque at the drive motor 15 with the target drive torque.

Since the damping filter f is not applied during the process of calculating the target drive torque based upon the power generation value, the power consumed at the drive motor 15 under the control executed to adjust the torque at the drive motor 15 to the target drive torque, exactly matches the power being generated.

Next, the structure of the damping filter f is described.

Figure 8:
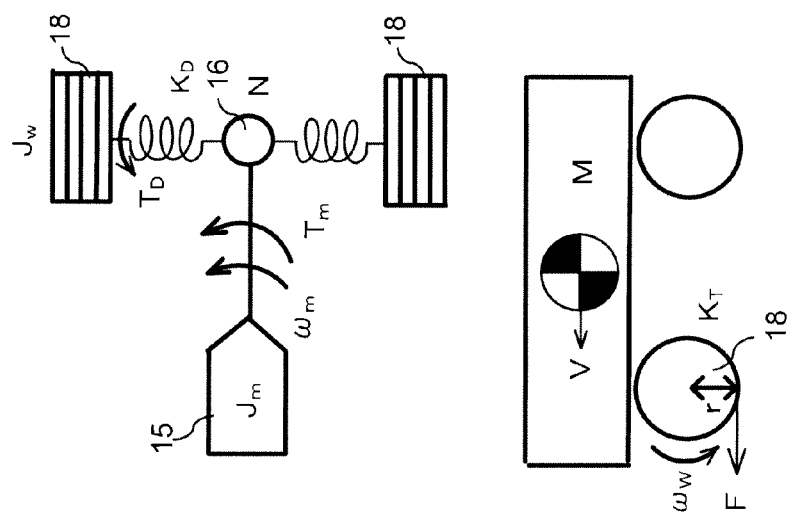
FIG. 8 is a diagram in reference to which equations of motion pertaining to the drive system will be described.

First, the transmission characteristics Gp(s) of a system, which, with the torque of the drive motor 15 input thereto, outputs the rotating speed of the drive motor 15, will be described. FIG. 8 is an illustration in reference to which the equations of motion applicable to the drive system of the vehicle 1 will be described, with various notations in the figure representing the following.

Jm: inertia of the drive motor 15
Jw: inertia of the drive wheels 18
M: mass of the vehicle 1
KD: torsional rigidity of the drive system KT: coefficient pertaining to friction of the tires against the road surface
N: overall gear ratio over the range extending from the output shaft of the drive motor 15 through the drive wheels 18
r: weighted radius of the tires
$\omega m$: angular speed of the drive motor 15
Tm: torque at the drive motor 15
TD: torque at the drive wheels 18
F: force applied to the vehicle 1
V: vehicle speed
$\omega w$: angular speed of the drive wheels 18
The concept illustrated in FIG. 8 can be expressed with the following equations of motion (1) through (5). "*" at the upper right of a letter indicates the time differential $$Jm \cdot \omega^* m = Tm - TD/N \quad (1)$$

$$2Jw \cdot \omega^* w = TD - rF \quad (2)$$

$$MV^* = F \quad (3)$$

$$TD = KDf(\omega m/N - \omega w)dt \quad (4)$$

$$F = KT(r\omega - V) \quad (5)$$

By determining the transmission characteristics Gp(s) based upon the equations of motion (1) through (5) above, the following expressions (6) through (14) are obtained. s represents a Laplacian operator.

$$Gp(s) = (b_3 s^3 + b_2 s^2 + b_1 s + b_0)/s(a_4 s^3 + a_3 s^2 + a_2 s + a_1) \quad (6)$$

$$a_4 = 2Jm \cdot Jw \cdot M \quad (7)$$

$$a_3 = Jm(2Jw + Mr^2)KT \quad (8)$$

$$a_2 = (Jm + 2Jw/N^2)m \cdot KD \quad (9)$$

$$a_1 = (Jm + 2Jw/N^2 + Mr^2/N^2)KD \cdot KT \quad (10)$$

$$b_3 = 2Jw \cdot m \quad (11)$$

$$b_2 = (2Jw + Mr^2)KT \quad (12)$$

$$b_1 = m \cdot KD \quad (13)$$

$$b_0 = KD \cdot KT \quad (14)$$

The value indicated at a given pole in the transmission characteristics Gp(s) is proved to be very close to a value indicated at a 0 point in the transmission characteristics Gp(s) through investigation of the poles and the 0 points in the transmission characteristics Gp(s). These two values are equivalent to $\alpha$ and $\beta$ in the following expression (15) taking on very similar values.

$$Gp(S) = (S+\beta)(b_2's^2 + b_1's + b_0')/s(s+\alpha)(a_3's^2 + a_2's + a_1') \quad (15)$$

Accordingly, the orders of the transmission function Gp(s) can be lowered to (second order)/(third order) as expressed in (16) below by canceling out the pole and the 0 point through approximation; $\alpha = \beta$ in expression (15).

$$Gp(s) = (b_2's^2 + b_1's + b_0')/s(a_3's^2 + a_2's + a_1') \quad (16)$$

By using $a_1'$ $a_3'$ in the denominator of expression (16), a resonance angular speed $\omega_n$ of the torsional vibration of the drive system can be calculated as expressed in (17) below $$\omega_n = (a_1'/a_3')^{1/2} \quad (17)$$

The damping filter f is configured so as to achieve characteristics whereby the frequency component equivalent to the torsional vibration of the drive system, which assumes a specific width containing a frequency corresponding to the resonance angular speed $\omega_n$, is removed from the power generation value or such a frequency component in the power generation value is reduced. The specific width is adjusted as necessary in order to assure a satisfactory damping effect on the torsional vibration of the drive system.

Such a damping filter f may be, for instance, a notch filter that assumes a natural frequency substantially equal to the resonance angular speed $\omega_n$ of the torsional vibration of the drive system. The transmission characteristics of this notch filter will be as expressed in (18) below. $\zeta$ in the expression represents a parameter used to set the width of the frequency component to be removed or reduced.

$$G_{notch}(S) = (s^2 + \omega_n^2)/(s^2 + 2\zeta\omega_n^2) \quad (18)$$

As an alternative, the damping filter f may adopt the structure described below.

In relation to the transmission characteristics with which the rotating speed relative to the torque at the drive motor 15 is transmitted, the damping filter f may be configured as a filter achieving transmission characteristics expressed as Gm(s)/Gp(s) with Gm(s) representing the transmission characteristics of an ideal model, free of any torsional vibration of the drive system and Gp(s) representing the transmission characteristics of a model containing torsional vibration of the drive system. While Gp(s) in the filter may be either that expressed in (15) or (16), the order of the damping filter f can be lowered and thus, the arithmetic operational load on the system controller 20 can be reduced in conjunction with Gp(s) in expression (16).

For instance, with Gm(s) expressed as in (19) below and Gp(s) expressed in (16), a damping filter f achieving "second order/second order" transmission characteristics expressed as in (20) below is configured.

$$Gm(s) = (b_2's^2 + b_1's + b_0')/s(a_{ref3}*s^2 + a_{ref2}s + a_{ref1}) \quad (19)$$

$$Gm(s)/Gp(s) = (a_3's^2 + a_2's + a_1')/(a_{ref3}*s^2 + a_{ref2}s + a_{ref1}) \quad (20)$$

By using the damping filter f with the transmission characteristics expressed in (20), rotating speed transmission characteristics pertaining to the rotating speed relative to the torque at the drive motor 15, which are closer to those of the ideal model Gm(s), can be achieved, i.e., the response characteristics of the drive motor 15 can be adjusted to the response characteristics intended by the designer, within the power generation capability range of the generator 12, in addition to removing or reducing the frequency component in the generated power, which is equivalent to the torsional vibration of the drive system.

It is to be noted that structures that may be adopted in the damping filter f are not limited to those described above and it may assume any other structure as long as it assures characteristics whereby a frequency component equivalent to the torsional vibration of the drive system in the generated power is removed altogether or reduced.

The advantageous effects achieved through the embodiment will next be described.

Figure 9A:
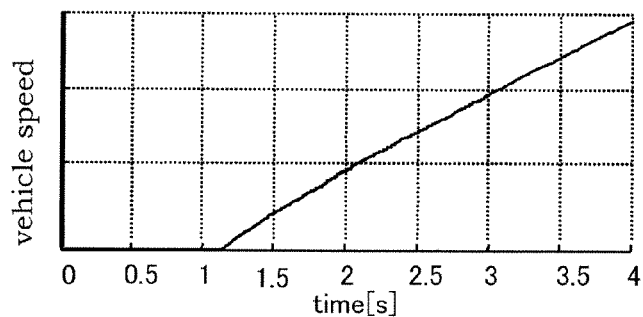
FIGS. 9A to 9F are timing charts enabling comparison of vehicle speeds, accelerations and generated power/drive power achieved at vehicle take-off under the control executed in the embodiment of this invention and under control executed in a comparison example.
Figure 9B:
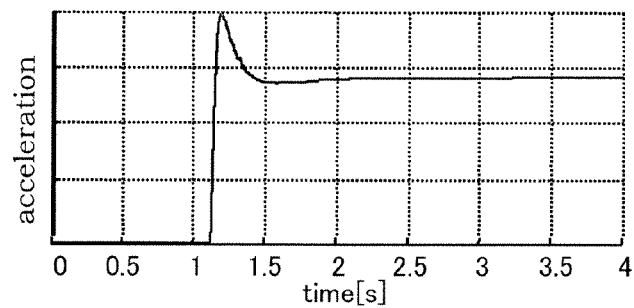
Figure 9C:
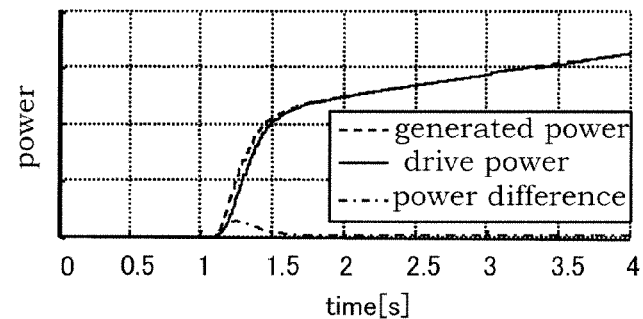

In a series hybrid vehicle in a comparison example for which the direct distribution control is executed, power generation control is executed without taking into consideration the torsional vibration of the drive system but the frequency component in the target drive torque of the drive motor 15, corresponding to the torsional vibration of the drive system, is removed or reduced via a damping filter f under drive control. Conditions of this vehicle observed as it accelerates from a take-off are indicated in FIGS. 9A through 9C. While smooth starting acceleration is achieved with the torsional vibration of the drive system suppressed through the damping effect of the damping filter f in this comparison example, a difference between the generated power and the drive power occurs immediately after take-off.

Figure 9D:
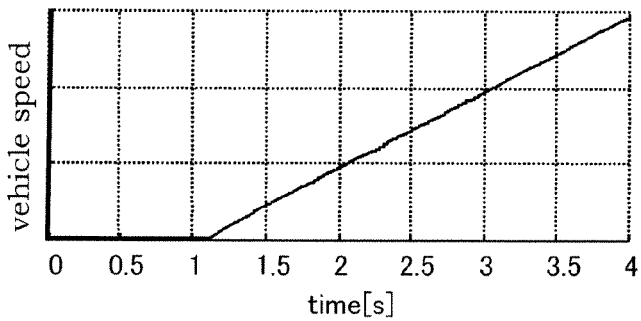
Figure 9E:
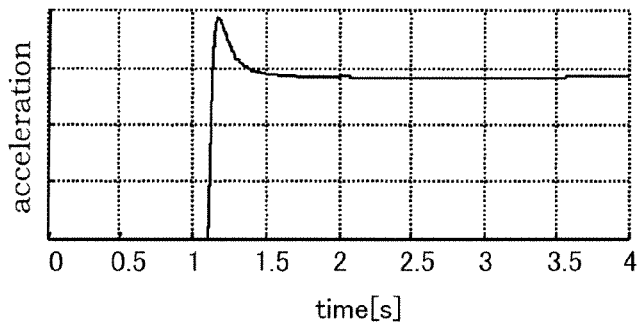
Figure 9F:
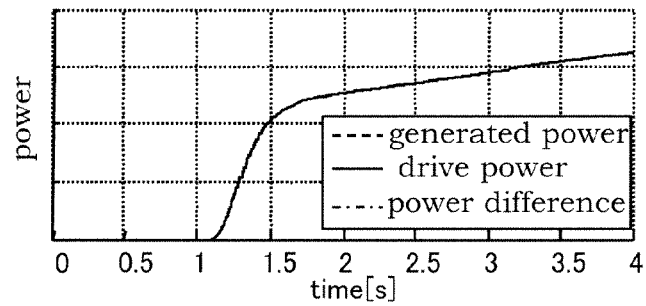

FIGS. 9D through 9F indicate the conditions observed as the vehicle 1 takes off and accelerates under the control achieved in the embodiment. Through the control executed in the embodiment, the generated power and the drive power can be made to match, as well as achieving smooth take-off/acceleration through suppression of the torsional vibration of the drive system.

Such smooth take-off/acceleration is achieved in the embodiment through the use of the damping filter f that removes or reduces a frequency component in the generated power, which is equivalent to the torsional vibration of the drive system. Namely, as the frequency component equivalent to the torsional vibration of the drive system is removed or reduced, a frequency component in the target drive torque calculated for the drive motor 15 based upon the power generation value, which is also equivalent to the torsional vibration of the drive system is removed or reduced and the drive motor 15 is then controlled based upon the ultimate target drive torque.

In addition, since the damping filter f is specifically applied in conjunction with the target generator torque and is not applied while the target drive torque for the drive motor 15 is calculated based upon the power generation value, the generated power and the drive power can be made to match each other without allowing the damping filter f to cause dissociation of the generated power and the drive power.

Consequently, even if the charge/discharge of the battery 17 should be restricted while the vehicle takes-off and accelerates as described above, the power generated at the generator 12 can be completely consumed at the drive motor 15 to ensure that the battery 17 is not charged or discharged under the control executed in the embodiment.

A second embodiment of this invention will be described next.

The system controller 20 in the second embodiment executes rotating speed control distinguishable from that executed in the first embodiment.

FIG. 10A is a block diagram of the rotating speed control executed in the second embodiment. The rotating speed control executed in the second embodiment comprises a proportional control block 131 and a disturbance observer block 132. P in the figure represents a proportional control gain.

A transmission characteristics model Gg'(s) of rotating speed transmission characteristics Gg(s) pertaining to the rotating speed relative to the input torque at the generation device 10, i.e., the control target, may be expressed as in (21) below.

$J_g$ in the expression represents the inertia at the generation device 10.

$$Gg'(s)=1/(J_g s) \quad (21)$$

H(s) in the figure represents a linear low pass filter assuming an order equal to that of Gg'(s). H(s) is used to adjust the disturbance tolerance characteristics and the stability of the disturbance observer block 132 by using its time constant.

The disturbance observer block 132 estimates the extent of a disturbance input to the control target generation device 10 by applying transmission characteristics expressed as H(s)/Gg'(s) in an inverse system of H(s) and Gg'(s) to the difference between the output of the control target model Gg'(s) to which the previous target generator torque value is input and the rotating speed (detected value) of the generator 12. It is to be noted that the estimated disturbance value estimated by the disturbance observer block 132 is primarily attributed to the engine torque.

In conjunction with the disturbance observer block 132 engaged in the rotating speed control described above, a damping filter f is installed at a stage preceding the control target model Gg'(s) within the disturbance observer block 132 as well, as shown in FIG. 10A, so as to enable the disturbance observer block 132 to estimate the disturbance based upon the most recent target generator torque value having undergone filter processing. While a damping filter f present at a rear stage in the rotating speed control may interfere with the disturbance observer block 132 to result in a lowered damping effect, such interference can be prevented by installing a damping filter f at a stage preceding the control target model Gg'(s), as in this example.

By executing the rotating speed control in conjunction with the structure described above, too, the generated power and the drive power can be made to match each other while suppressing torsional vibration of the drive system, as in the first embodiment.

It is to be noted that the block diagram in FIG. 10B, pertaining to control resulting from equivalent conversion of the control shown in FIG. 10A, shows a damping filter f assuming a different position. In conjunction with a damping filter f installed at this position, too, advantageous effects similar to those of the control shown in the block diagram in FIG. 10A will be achieved.

A third embodiment of this invention will be described next.

The system controller 20 in the third embodiment executes power generation control distinguishable from that executed in the first embodiment.

Figure 11:
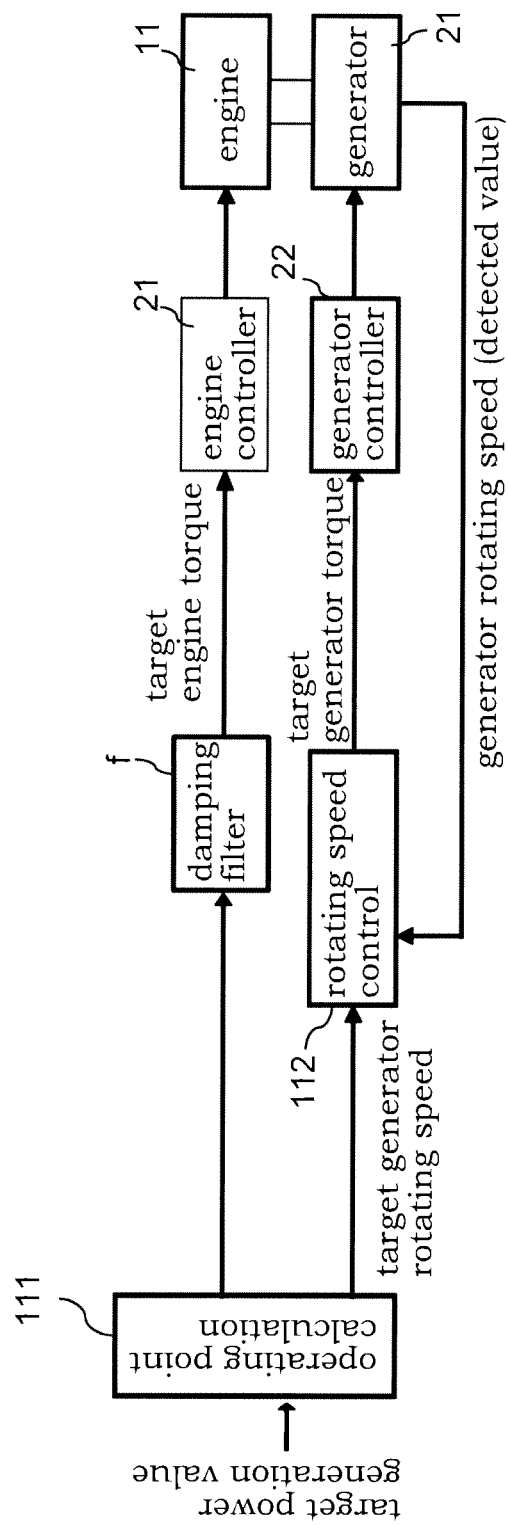
FIG. 11 is a block diagram in reference to which power generation control executed in a third embodiment of this invention will be described in detail.

FIG. 11 is a block diagram of the power generation control executed in the third embodiment. It is distinguishable from the power generation control executed in the first embodiment as shown in the block diagram in FIG. 5 in that the system controller 20 indicates a target engine torque obtained by filtering through a damping filter f, the target engine torque calculated in the operating point calculation block 111, to the engine controller 21.

As explained earlier, the generated power is substantially equal to the value obtained by multiplying the torque input to the generator 12 by the rotating speed of the generator 12. Accordingly, a damping filter f may be used to remove or reduce a frequency component in the target engine torque calculated for the engine, instead of the target generator torque calculated for the generator 12, which is equivalent to the torsional vibration of the drive system, so as to remove or reduce the same component in the torque input to the generator 12. Through such use of a damping filter f, too, the frequency component equivalent to the torsional vibration of the drive system, in the generated power can be removed or reduced.

Consequently, through the third embodiment, too, the generated power and the drive power can be made to match each other while suppressing the torsional vibration of the drive system as in the first and second embodiments.

It is to be noted that any of the first through third embodiments described above may be adopted in a hybrid vehicle that is not equipped with the battery 17 used for regenerated power storage and drive power discharge. In such an application, since a sudden rise in voltage due to excessive power generation at the generator 12 or a sudden drop in voltage due to insufficient power generation at the generator 12 does not occur as the power generated at the generator 12 is fully consumed at the drive motor 15, stable control is assured.

Next, a fourth embodiment of this invention will be described.

While the vehicle system configuration of the fourth embodiment is similar to that described in reference to the first embodiment, the power supply source that provides electric power to the drive motor 15 in the fourth embodiment is different from that in the first embodiment.

The first embodiment adopts a structure configured on the premise that the power provided to the drive motor 15 originates exclusively from the generator 12, i.e., a structure that includes a singular power supply source constituted with a generator 12. In contrast, in the structure adopted in the fourth embodiment, the battery 17, in addition to the generator 12, is utilized as a power supply source that provides electric power.

It is to be noted that the structure achieved in the first embodiment is such that any limits imposed upon the power input to the battery 17 are not applied by the battery controller 23 that directly controls the battery 17. Rather, the system controller 20 determines requested power based upon the vehicle conditions and controls the power generated at the generator 12 based upon the requested power. The system controller 20 executes the power generation control by ensuring that power is generated in an amount that can be completely used by the drive motor 15 so as to prevent any power from being input to the battery 17.

As long as the generator 12 is the sole power supply source, the system controller 20 simply needs to issue, via a damping filter f, a command indicating the optimal power to be generated by the generator 12, as in the first embodiment so as to ensure that all the power generated at the generator 12 is used up at the drive motor 15. In this situation, since power is not generated in excess of the power being consumed, no electric power flows through the battery 17.

However, power may be generated in excess of the power being used up in the structure adopted in the fourth embodiment, in which power is provided to the drive motor 15 from the battery 17 as well, and the power supply to the drive motor 15 is not controlled by the battery controller 23 by controlling the battery 17 itself as described earlier.

It is to be noted that as long as the battery 17 is a sole power supply source, the battery 17 discharges power in the exact amount consumed at the drive motor 15 even if the battery controller 23 does not control the battery 17 itself in order to regulate the power discharge from the battery 17. Namely, the power discharged from the battery 17 exactly matches the power consumed at the drive motor 15 without creating any excess power. In addition, in a structure in which a restriction on power input to the battery 17 is imposed by the battery controller 23 through control of the battery 17 itself, the battery 17 would never be charged with any excess power.

Next, in reference to the control block diagram in FIG. 12 and the flowchart in FIG. 13, operations of the system controller 20 executed to achieve semi-direct distribution control in conjunction with the generator 12 and the battery 17 both working as power supply sources, will be described.

The semi-direct distribution control is executed by the system controller 20 in order to achieve power utilization within the limit of the allowable battery output power and drive power consumption corresponding to the power being generated by allowing the battery 17 to generate power strictly as an auxiliary power source to assist drive in response to a drive request while charging the battery 17 to the extent possible. Such semi-direct distribution control may be executed when, for instance, the battery temperature has become low and charge/discharge at the battery 17 is restricted. In this situation, the allowable battery input power and the allowable battery output power will both be regulated to levels lower than the true battery capacity.

Figure 12:
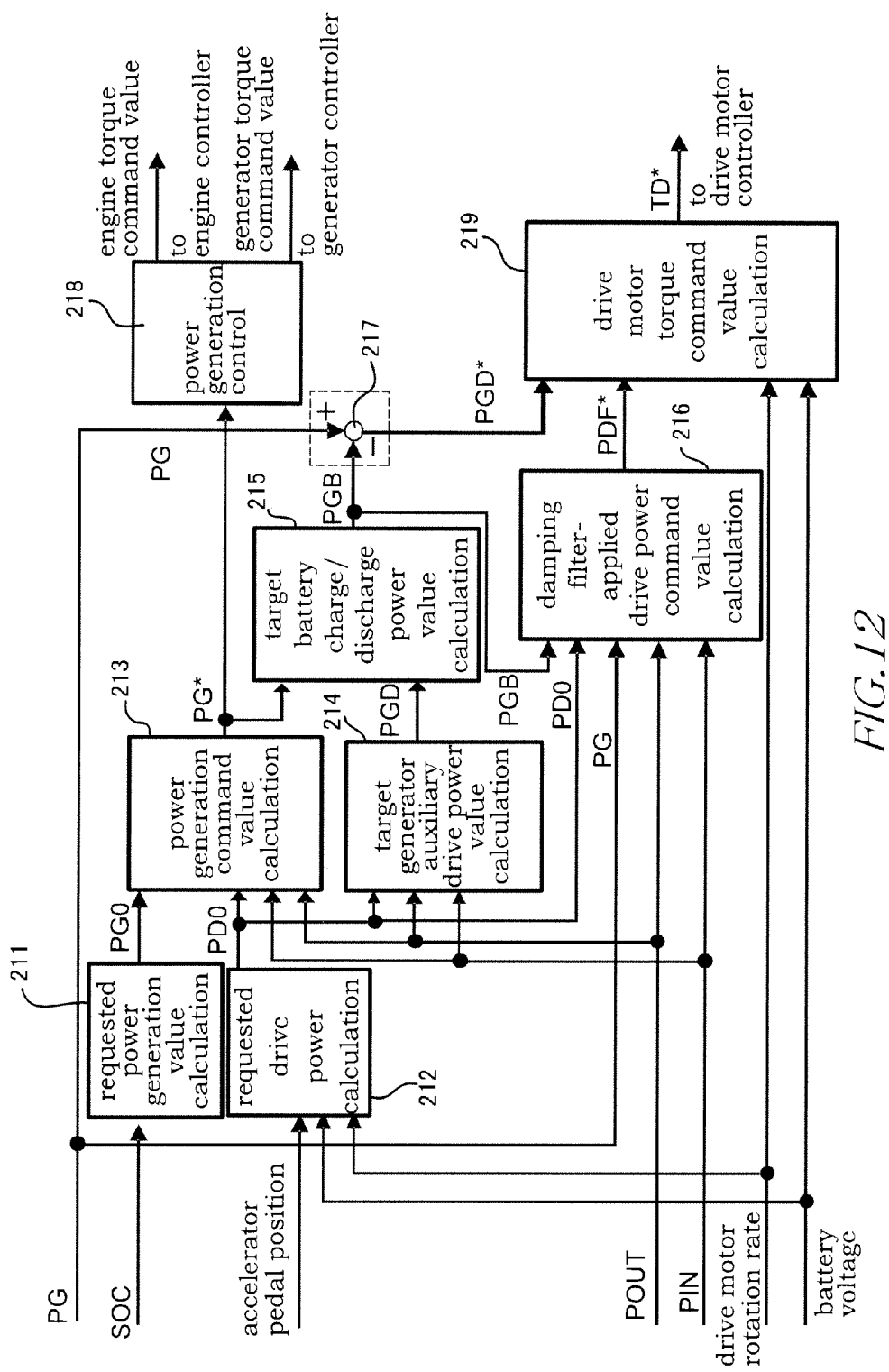
FIG. 12 is a block diagram in reference to which power generation control executed in a fourth embodiment of this invention will be described in detail.
Figure 13:
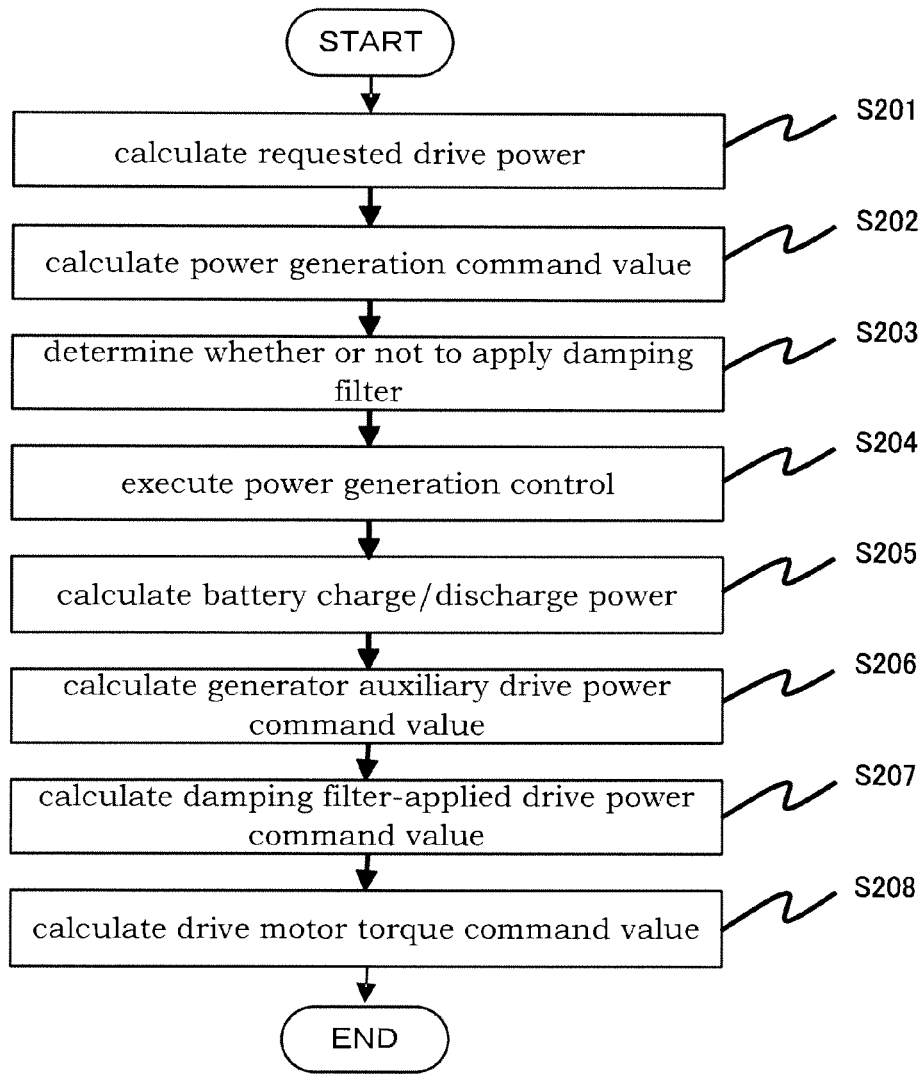
FIG. 13 is a flowchart of system controller operations.

FIG. 12 is a block diagram in reference to which the power generation control executed in the fourth embodiment will be described, whereas FIG. 13 is a flowchart of a control routine in reference to which the control will be described in more specific terms. This control routine is repeatedly executed over a specific time intervals, e.g., over intervals of 10 ms, while the vehicle travels. The control will be described in detail below in reference to the flowchart in FIG. 13.

In a step S201, the system controller 20 calculates requested drive power PD0 based upon the accelerator pedal position, the battery voltage and the drive motor rotating speed. Since the specific operation executed to calculate the requested drive power is similar to that described in reference to the block diagram in FIG. 3, a detailed explanation is not provided. This arithmetic operation is equivalent to that executed in a requested drive power calculation block 212 in FIG. 12.

Figure 14:
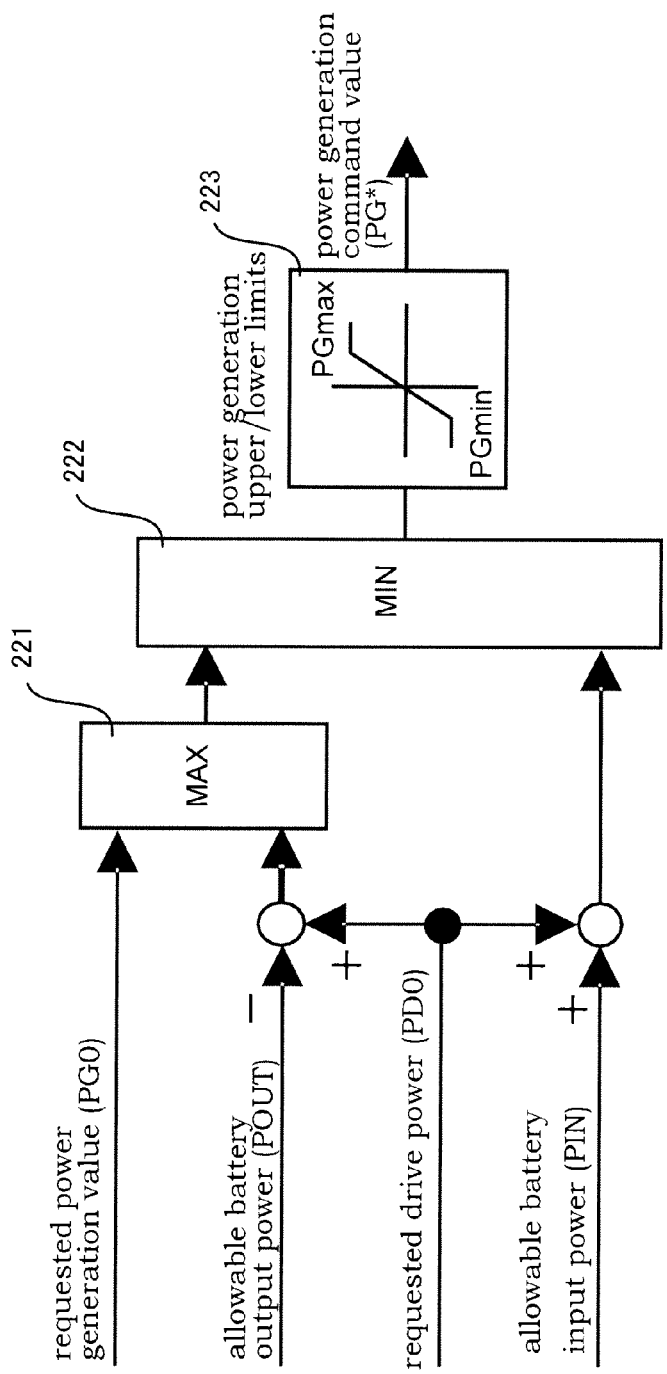
FIG. 14 is a block diagram in reference to which power generation command value calculation will be described in detail.

In a step S202, the system controller 20 calculates a power generation command value based upon the SOC of the battery 17, the allowable battery input power PIN, the allowable battery output power POUT and the requested drive power determined in the step S201. This operation will be described in detail in reference to the block diagram in FIG. 14.

Figure 15:
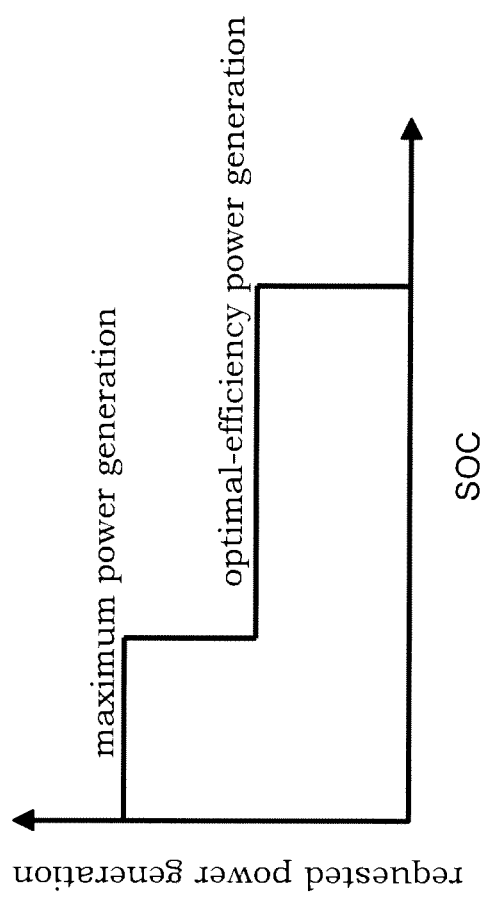
FIG. 15 shows the characteristics of a requested power generation map stored in the system controller.

The system controller 20 first calculates a requested power generation value PG0. The requested power generation value is calculated based upon the battery SOC by using a requested power generation map indicating a preset relationship between the battery SOC and the requested power generation value, such as that shown in FIG. 15. It is to be noted that the requested power generation map in FIG. 15 is set so that the requested power generation value matches the maximum power generation over a range in which the SOC is relatively low and that the requested power generation value matches an optimal-efficiency power generation value lower than the maximum power generation value over a range in which the SOC is relatively high.

Next, in a block 221, the system controller compares the requested power generation value PG0 and a value PD0−POUT obtained by subtracting the allowable battery output power POUT from the requested drive power PD0 calculated in the step S201 and determines the larger value (A=max (PG0, PD0−POUT)). The system controller 20 then compares the value A with the sum PD0+PIN of the requested drive power PD0 and the allowable battery input power PIN and determines the smaller value (B=min (A, PD0+PIN)) in a block 222. Next, in a block 223, the system controller 20 calculates a power generation command value PG* by setting a maximum power generation value PGmax and a minimum PGmin respectively as the upper limit and the lower limit for the value B. As a result, the generator 12 is engaged in operation to generate supplementary to make up for any discrepancy between the allowable battery output power and the requested drive power while keeping the requested power generation value equal to or less than the allowable battery input power. These arithmetic operations are equivalent to those executed in a requested power generation value calculation block 211 and a power generation command value calculation block 213 in FIG. 12.

In a step S203 in FIG. 13, the system controller 20 determines, based upon the requested drive power PD0 having been calculated in the step S201 and the battery power input/output power PIN and POUT, as to whether or not to execute damping filter processing at the generator 12. If the requested drive power PD0 is greater than the allowable battery output power POUT or if the requested drive power PD0 is less than a value obtained by multiplying the allowable battery input power by −1, the system controller 20 determines that the damping filter processing is to be executed at the generator 12.

In a step S204, the system controller 20 calculates an engine torque command value for the engine controller 21 and a generator torque command value for the generator controller 22. Since the arithmetic operations executed to calculate these values are similar to those executed in the step S2 in FIG. 2 having been described earlier, they will not be explained in detail. It is to be noted that these arithmetic operations are equivalent to those executed in a power generation control block 218 in FIG. 12.

In a step S205, the system controller 20 calculates a target battery charge/discharge power value PGB in correspondence to the power generation command value PG* and a specific part of the power generation command value, which represents the power to be supplied as the drive power, i.e., a target auxiliary drive power value PGD set for the generator 12. The target auxiliary drive power value PGD set for the generator 12 is equivalent to the target power generation value indicating the generated power to be directly distributed.

Figure 16:
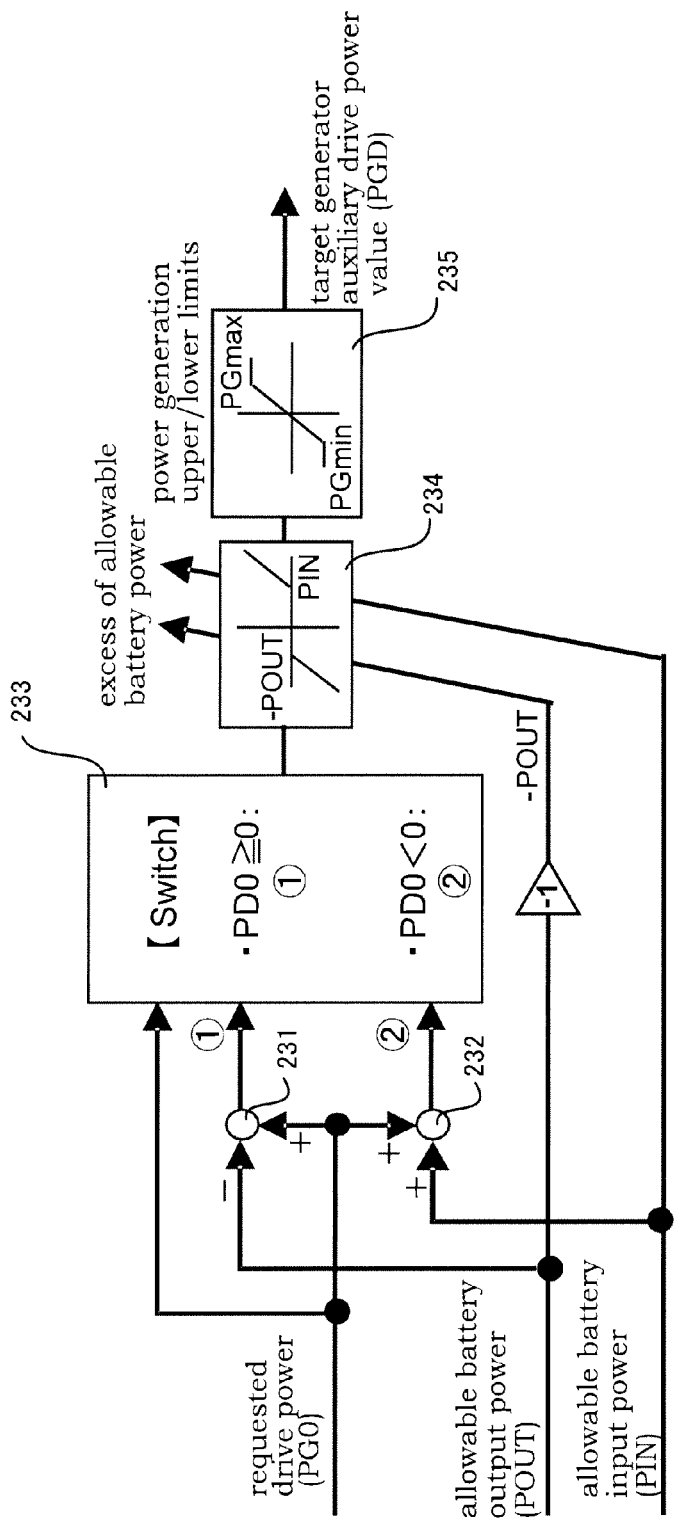
FIG. 16 is a block diagram in reference to which generator•auxiliary drive power target value calculation executed in an embodiment of this invention will be described in detail.

The system controller 20 first calculates the target auxiliary drive power value PGD for the generator as shown in the block diagram in FIG. 16. Namely, in a block 231, the system controller 20 calculates the difference PD0−POUT between the requested drive power PD0 and the allowable output power POUT and in a block 232, the system controller calculates the sum PD0+PIN of the requested drive power PD0 and the allowable input power PIN. The calculation results are then input to a switch 233. In addition to the calculation results, the requested drive power PD0 is also input to the switch 233. If the requested drive power PD0 is equal to or greater than 0, i.e., if the vehicle 1 is currently engaged in power running, the system controller 20 sets the difference PD0−POUT as a target drive power value PGD0 for the generator 12. If, on the other hand, the requested drive power PD0 is less than 0, i.e., in a regenerative state, the system controller 20 selects the sum PD0+PIN as a target auxiliary drive power candidate value PGD0 for the generator 12. In other words, the target auxiliary drive power value PGD0 for the generator 12 is determined as expressed in (22) below.

$$PGD0=PD0-POUT (PD0\geq0)$$

$$PGD0=PD0+PIN (PD0<0) \quad (22)$$

In a block 234, the system controller 20 executes dead zone processing as expressed below for the target auxiliary drive power candidate value PGD0 having been set for the generator 12, as described above, so as to calculate a target auxiliary drive power candidate value PGD1 for the generator 12.

$$PGD1=PGD0-PIN (PGD0\geq PIN)$$

$$PGD1=0 (PIN>PGD0>-PIN)$$

$$PGD1=PGD0+POUT (PGD0\leq POUT) \quad (23)$$

Then, in a block 235, the system controller 20 executes upper/lower limit processing for the target auxiliary drive power candidate value PGD1 having been calculated for the generator 12 by using the maximum power generation value PGmax and the minimum power generation value PGmin and designates the value resulting from the upper/lower limit processing as the target auxiliary drive power value PGD for the generator 12. The arithmetic operations executed up to this point are equivalent to a target auxiliary drive power command value calculation 214 executed for the generator 12 in FIG. 12.

Figure 17:
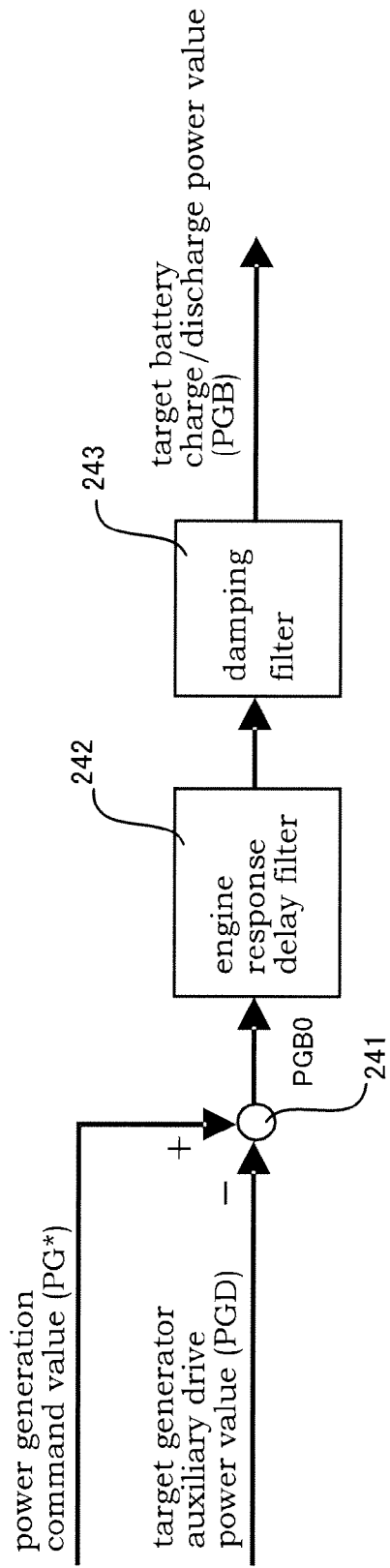
FIG. 17 is a block diagram in reference to which the battery charge/discharge power target value calculation executed by the system controller will be described in detail.

The system controller 20 next calculates the target battery charge/discharge power value PGB as shown in the block diagram in FIG. 17 based upon the power generation command value PG* calculated in the step S202 and the target auxiliary drive power value PGD having been calculated for the generator 12. The target battery charge/discharge power value PGB is subtracted from the power that is actually generated so as to determine the part of the power actually being generated, which is to be supplied to the drive motor 15.

First, in a block 241, the system controller 20 calculates the difference between the power generation command value PG* and the target auxiliary drive power value PGD set for the generator 12 as expressed in (24) below and designates the difference as a target battery-use power candidate value PGB0.

$$PGB0=PG*-PGD \quad (24)$$

In blocks 242 and 243, the system controller 20 filters the target battery-use power candidate value PGB0 through an engine response delay filter Ge(s) and a damping filter Gm(s)/Gp(s) as expressed in (26) below and designates the value having undergone the filter processing as the target battery charge/discharge power value PGB. By filtering the target battery-use power candidate value PGB0 through the engine response delay filter Ge(s), the phase of the target battery consumption power value PGB subtracted from the value representing the actual power being generated can be adjusted to match the phase of the actual power being generated, making it possible to determine the part of the power actually being generated to be directed to the drive motor 15, with a high level of accuracy. In addition, by subtracting the target battery consumption power value PGB having been filtered through the damping filter from the actually generated power likewise filtered through a damping filter, a value indicating the power to be provided to the drive motor in a filtered state can be calculated.

As a result, by providing the target battery charge/discharge power PGB to the drive motor 15, an ample damping effect is achieved to suppress the torsional vibration of the vehicle drive system while keeping the charge/discharge power to the battery 17 to or within the limits of the allowable input/output power of the battery 17.

The engine response delay filter Ge(s) used in this operation should be a linear delay filter such as that expressed as a transmission function in (25) below with Te representing an engine response delay time constant determined through testing.

$$Ge(s)=1/(Te\cdot s+1) \quad (25)$$

$$PGB=Ge(s)\cdot\{Gm(s)/Gp(s)\}PGB0 \quad (26)$$

The arithmetic operation executed to calculate the target battery charge/discharge power value PGB based upon the target generator auxiliary drive power value PGD and the power generation command value PG8 as described above is equivalent to the operation executed in a target battery charge/discharge power value calculation block 215 in FIG. 12.

Figure 18:
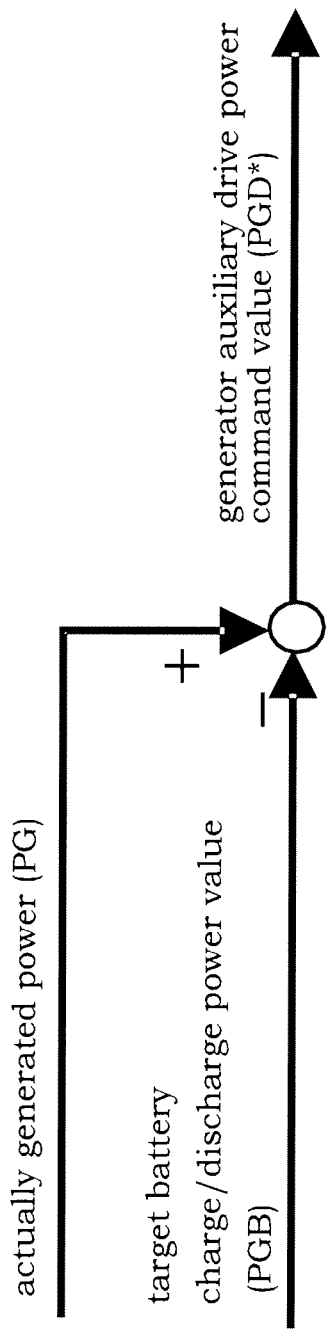
FIG. 18 is a block diagram in reference to which the generator•auxiliary drive power command value calculation executed by the system controller will be described in detail.

In a step S206 in FIG. 13, the system controller 20 calculates a generator auxiliary drive power command value PGD* based upon the measured power that is actually generated PG and the target battery charge/discharge power value PGB having been calculated in the step S205. The actually generated power PG may be determined as, for instance, the product of a current value detected via a current sensor that measures the DC current at the generator inverter 13 and a voltage value detected via a voltage sensor that measures the DC voltage. The system controller 20 then calculates the generator auxiliary drive power command value PGD* as expressed in (27) below as the difference between the actually generated power PG and the target battery charge/discharge power value PGB, as indicated in the block diagram in FIG. 18. The arithmetic operation executed to calculate the command value is equivalent to that executed in a block 217 in FIG. 12.

$$PGD^* = PG - PGB \quad (27)$$

Through this processing, the part of the power actually generated, which is to be provided to the drive motor, i.e., the power to be directly distributed, can be calculated. Since the value is calculated based upon the power generated under the power generation control executed in conjunction with a damping filter and the target battery charge/discharge power value having been filtered through the damping filter, good damping effect is achieved.

In a step S207, the system controller 20 calculates a damping filter-applied drive power command value PDF* based upon the requested drive power PD0, the actually generated power PG, the allowable battery input/output power PIN and POUT and the like. The arithmetic operation executed to calculate this value is equivalent to that executed in a damping filter-applied drive power command value calculation block 216 in FIG. 12.

Figure 19:
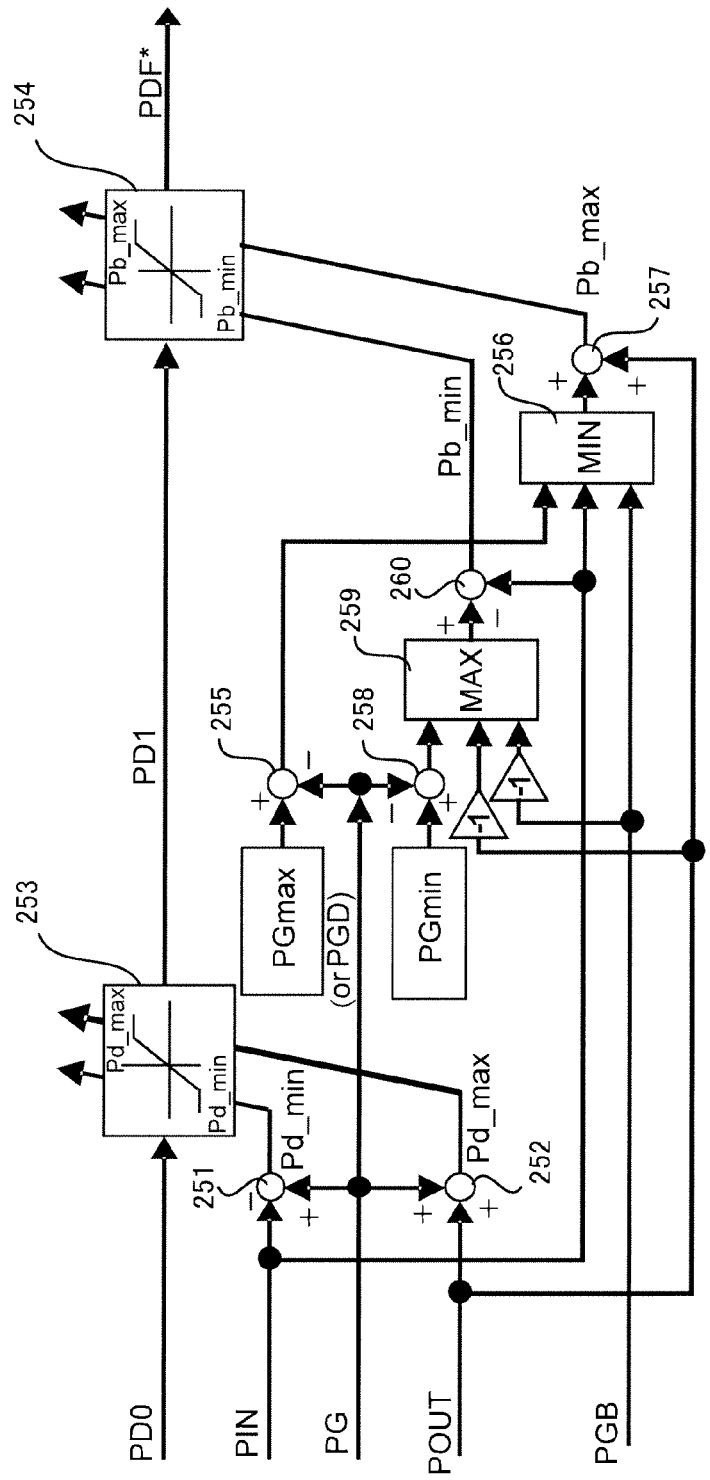
FIG. 19 is a block diagram in reference to which damping filter-applied drive power command value calculation executed by the system controller will be described in detail.

The processing executed in the damping filter-applied drive power command value PDF* calculation block 216 will be described below in reference to the block diagram in FIG. 19.

The system controller 20 applies limits to the requested drive power PD0 by setting the sum of the actually generated power PG and the allowable output power POUT as its upper limit Pd_max in a block 251 and setting the difference between the actually generated power PG and the allowable input power PIN as its lower limit Pd_min in a block 252. Then, in a block 253, it designates a value resulting from the upper/lower limit processing executed in conjunction with these limit values as a target drive-allocated power value PD1.

Then, in a block 254, the system controller 20 executes upper/lower limit processing for the target drive-allocated power value PD1 by setting the sum of the part of the actually generated power PD0, to be used to charge/discharge the battery 17, and the battery input power and the sum of the part of the actually generated power PD0, to be used to charge/discharge the battery 17, and the battery output power as upper/lower limits so as to calculate the damping filter-applied drive power command value PDF*.

The processing executed in the damping filter-applied drive power command value calculation block 254 will be described in further detail below. The system controller 20 selects in a block 256 a smallest value min (PGmax−PG, PIN, PGB) among a value PGmax−PG obtained in a block 255 by subtracting the actually generated power PG from the maximum power generation value PGmax, the allowable battery input power PIN and the target battery charge/discharge power value PGB. Then, in a block 257, the system controller 20 adds the allowable battery output power POUT to the selected value and designates the value min (PGmax−PG, PIN, PGB)+POUT thus obtained as an upper limit value Pb_max.

In addition, in a block 259, the system controller 20 selects a largest value max (PGmin−PG, −POUT, −PGB) among a value PGmin−PG obtained in a block 258 by subtracting the actually generated power PG from the minimum power generation value PGmin, the product of the allowable battery output power POUT and −1 and the product of the target battery charge/discharge power value PGB and −1. Then, in a block 260, the system controller 20 subtracts the allowable battery input power PIN from the selected value and designates the resulting value max (PGmin−PG, −POUT, −PGB)−PIN as a lower limit value Pb_min.

The system controller 20 executes the upper/lower limit processing for the target drive-allocated power value PD1 by using the upper limit value and the lower limit value having been calculated as described above and designates the value resulting from the upper/lower limit processing as the damping filter-applied drive power command value PDF*.

The damping filter-applied drive power command value PDF* calculated as described above allows the power currently allocated to the battery charge, too, to be supplied to the drive motor 15 in addition to the power that can be output from the battery in the event of, for instance, a drive request issued while the power being generated is charged into the battery 17. Through these measures, more power can be provided to the drive motor 15, and thus, better acceleration and better damping performance are assured while ensuring that the battery 17 is not charged or discharged beyond its allowable input/output power range.

It is to be noted that while the upper limit value and the lower limit value are respectively calculated as PGmax−PG and PGmin−PG based upon the actually generated power PG in the description provided above, the upper and lower limit values may be calculated by using the generator auxiliary drive power command value PGD* calculated as expressed in (27) instead of the actually generated power PG.

The processing executed in the step S207 as described above makes it possible to utilize the power generated through the power generation as well as the power that can be drawn out from the battery 17 when, for instance, a drive request is issued while the battery 17 is being charged with the power generated at the generator 12. Namely, under normal circumstances, only the power that can be output from the battery 17 can be provided to the drive motor 15 in response to a drive request issued while the battery 17 is being charged with the power generated at the generator 12. However, through the processing executed in the step S207, the drive motor 15 can be provided with power representing the sum of the power that can be output from the battery 17 and the generator power currently used to charge the battery 17. As a result, better acceleration and better damping performance are assured while ensuring that the battery 17 is not charged or discharged beyond its allowable input/output power range.

In a step S208 in FIG. 13, the system controller 20 calculates a drive motor torque command value TD* to be used to ensure that the power generated at the generator 12 is consumed at the drive motor 15 without exceeding the allowable input/output power range of the battery 17. The arithmetic operation executed to calculate this value is equivalent to the processing executed in a drive motor torque command value calculation block 219 in FIG. 12.

Figure 20:
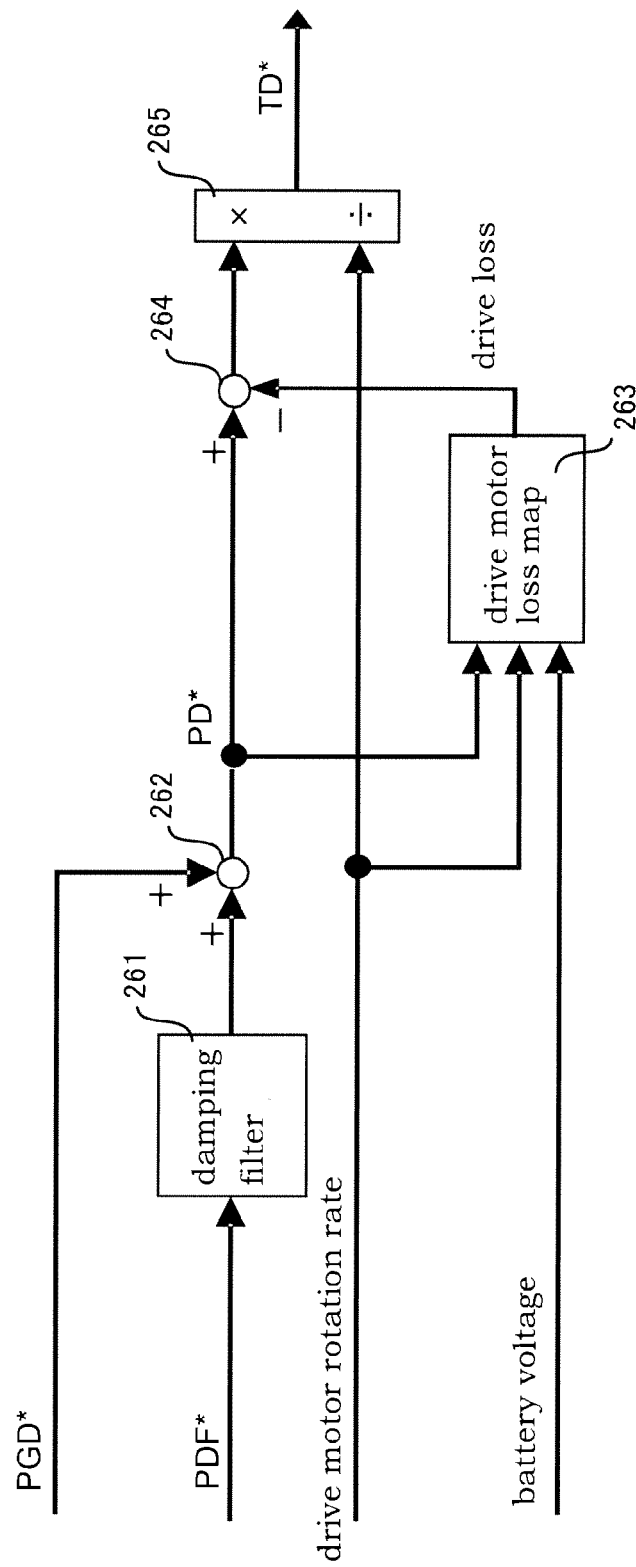
FIG. 20 is a block diagram in reference to which the drive motor torque command value calculation executed by the system controller will be described in detail.

The drive motor torque command value TD* is calculated by the system controller 20 based upon the damping filter-applied drive power command value PDF*, the generator auxiliary drive power command value PGD* and the like as described below in reference to the block diagram in FIG. 20.

First, in a block 261, the system controller 20 applies a damping filter to the damping filter-applied drive power command value PDF* having been calculated in the step S207. The damping filter-applied at this time needs to be set by ensuring that the damping filter-applied drive power command value PDF* does not deviate beyond the range defined by the upper and lower limit values having been set for the arithmetic operation processing executed in the step S207 and that no lead compensation occurs. Accordingly, the system controller 20 sets the parameters $a_{ref1}$, $a_{ref2}$ and $a_{ref3}$ in the ideal model Gm(s) expressed in (19) so that the ideal model Gm(s) is not lead compensated relative to the transmission characteristics model Gp(s) expressed in (16). Namely, it sets the parameters as indicated in (28) and (29) below.

$$a_{ref1}/a_{ref3} \geq a_1'/a_3' \tag{28}$$

$$a_{ref2}/(2 \cdot (a_{ref1} \cdot a_{ref3})^{1/2}) \geq 1 \tag{29}$$

Expression (28) indicates that $a_{ref1}/a_{ref3}$ representing the square of the natural angular speed in the ideal model Gm(s) is set greater than the torsional resonance angular speed $\omega n((a_1'/a_3')^{1/2})$ in the transmission characteristics model Gp(s). In addition, expression (29) indicates that a damping coefficient for the ideal model Gm(s) needs to be set equal to or greater than 1 so as to achieve vibration-free characteristics.

In a block 262, the system controller 20 calculates the sum of the value obtained by filtering the damping filter-applied drive power command value PDF* through a damping filter as described earlier and the generator auxiliary drive power command value PGD* calculated in the step S206 and designates the sum as the drive power command value PD*. In a block 263, the system controller 20 calculates a drive loss at the drive motor 15 by searching through a drive motor loss map based upon the drive motor rotating speed, the battery voltage (or the drive inverter voltage) and the drive power command value PD*. Then, in a block 264, the system controller 20 subtracts the drive loss from the drive power command value PD*. In a block 265, it designates a value obtained by dividing the difference between the drive power command value PD* and the drive loss by the drive motor rotating speed as an ultimate drive motor torque command value TD* to be ultimately provided in a command to the drive motor 15.

Next, the advantageous effects of the embodiment will be described in reference to the timing charts in FIGS. 21A through 21D and FIGS. 22A through 22D.

FIGS. 21A to 21D indicate conditions observed when damping filter processing is executed entirely at the drive motor 15 based upon the generated power and the power output from the battery 17 in a comparison example. FIGS. 22A to 22D indicate conditions observed under the control executed in the embodiment.

The following description will be given by assuming that power generation starts at a specific requested power generation value PG0 (>PIN) at a time point 0 sec and that the vehicle is accelerated at a time point 1 sec by altering the requested drive power PD0 to a specific value in steps while the battery input/output power levels are regulated to match specific values.

Both in the comparison example and in the embodiment, power is generated within the range defined by the allowable input power PIN and the battery 17 is charged with power equal to or less than the allowable input power from the time point 0 sec through the time point 1 sec.

Figure 21A:
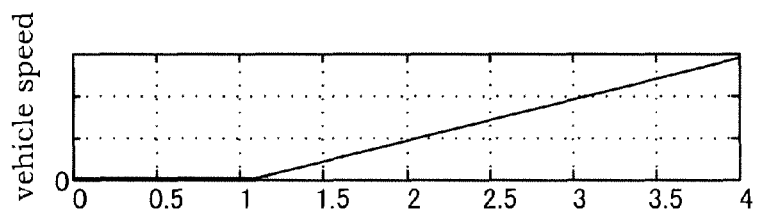
FIGS. 21A to 21D are timing charts indicating changes in the vehicle speed, the acceleration, the power and the battery input/output power observed at a vehicle take-off under control executed in a comparison example.
Figure 21B:
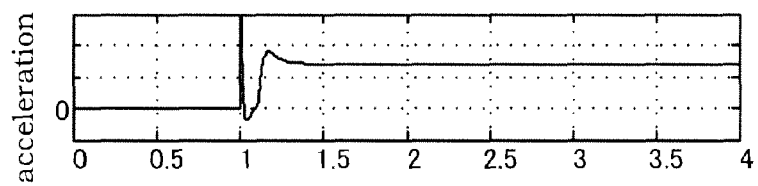
Figure 21C:
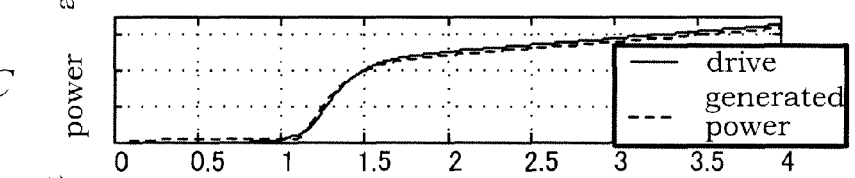
Figure 21D:
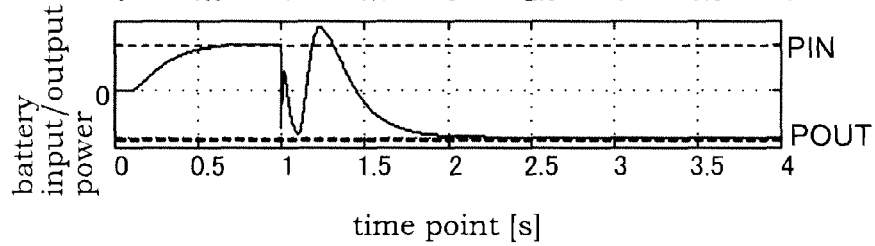

Following the time point 1 sec at which the acceleration starts, the vehicle in the comparison example accelerates smoothly, as indicated in FIG. 21A by suppressing any torsional vibration through the damping filter effect but the battery 17 becomes overcharged with power exceeding the allowable input power, as indicated in FIG. 21D.

Figure 22A:
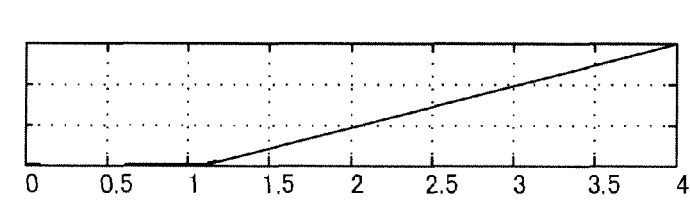
FIGS. 22A to 22D are timing charts indicating changes in the vehicle speed, the acceleration, the power and the battery input/output power observed at vehicle take-off under control executed in the fourth embodiment.
Figure 22B:
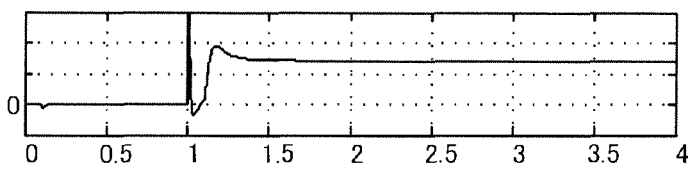
Figure 22C:
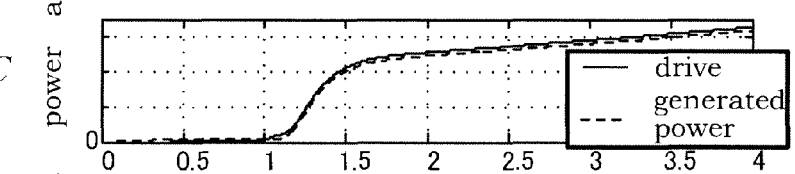
Figure 22D:
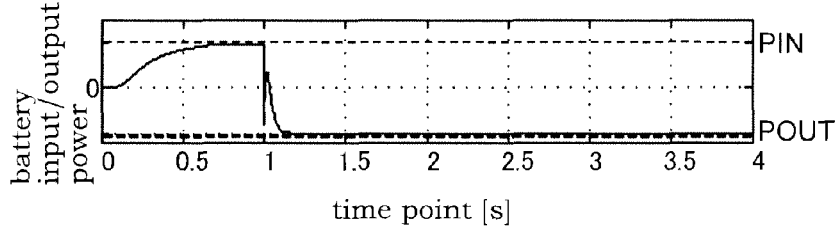

In contrast, under the control executed in the embodiment, smooth acceleration, free of any torsional vibration, is achieved and, at the same time, the input/output power at the battery 17 can be held within the range defined by the allowable input/output power levels, as indicated in FIG. 22D. Furthermore, the power in the battery 17 can be effectively utilized within the allowable input/output power range.

As described above, under the control executed in the embodiment, the actually generated power and the drive power can be made to match each other while suppressing any torsional vibration of the drive system, as in the first through third embodiments, even when the drive motor 15 and the battery 17 are both used as power supply sources.

The embodiments of this invention described herein simply represent examples of applications and the technological scope of the invention is in no way limited to the specific structural details of the embodiments.

For instance, while the power input to, and output from the battery 17 is either disallowed or limited in the embodiments described above, the sum of the power provided through power generation and the power supplied from the battery 17 can be equalized with the power used at the drive motor 15 when the SOC in the battery 17 is 100% and no input/output restriction is applied at the battery 17.

This invention may be further adopted in a series/parallel hybrid vehicle allowing series/parallel switchover. By executing the control described in reference to the embodiments while such a vehicle is engaged in series operation, similar advantages will be achieved.

It is to be noted that while the invention has been particularly shown and described with respect to preferred embodiments thereof by referring to the attached drawings, this invention is not limited to the examples and it will be understood by those skilled in the art that various changes in form and detail may be made therein without departing from the spirit, scope and teaching of the invention.

Figure 5:
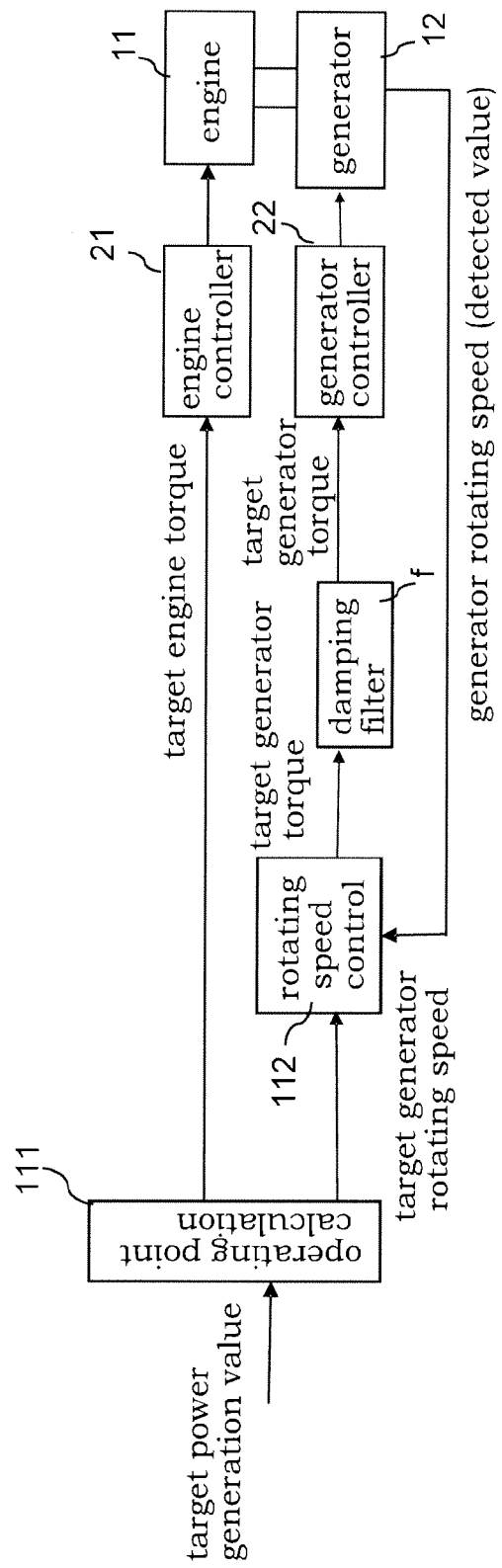
FIG. 5 is a block diagram in reference to which power generation control executed by the system controller will be described in detail.
Figure 6:
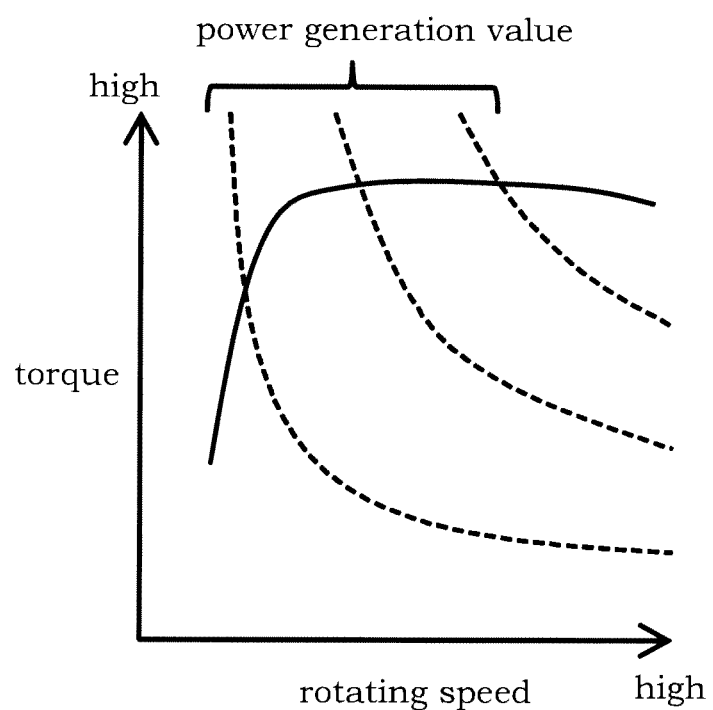
FIG. 6 shows the characteristics of an operating point map stored in the system controller.
Figure 23:
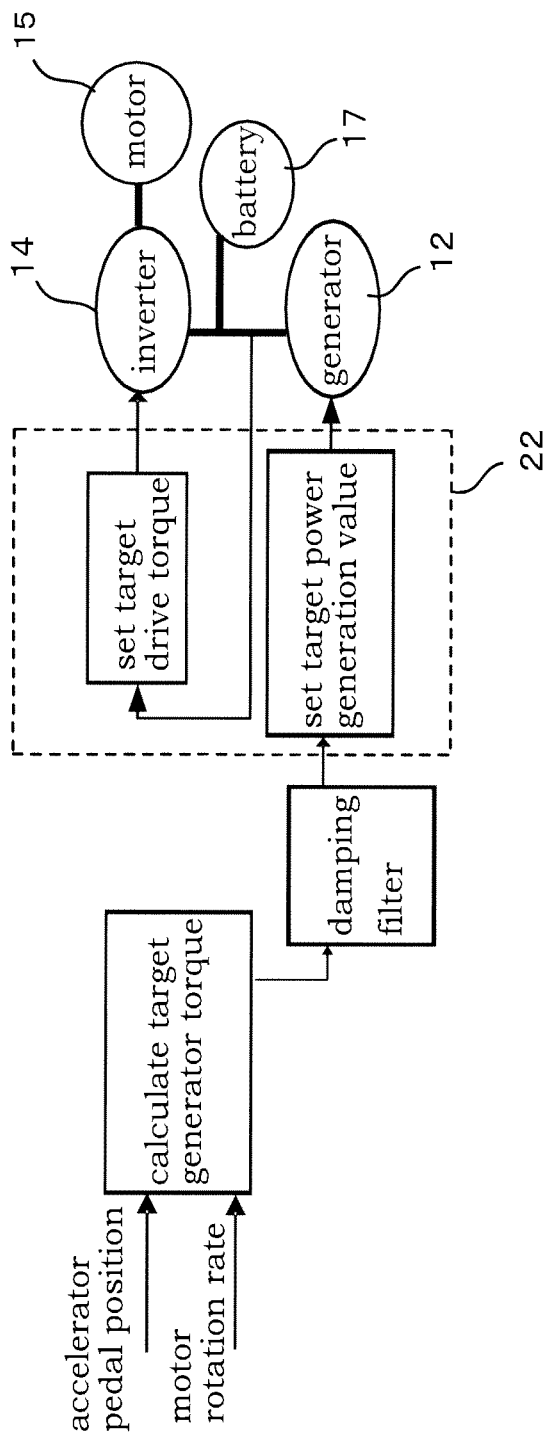
FIG. 23 is a block diagram of arithmetic operations executed in a generator controller shown in FIG. 5.

For instance, the arithmetic operations executed by the generator controller 22 in FIG. 5, in reference to which the first embodiment has been described may be summarized as illustrated in FIG. 23. Namely, the target power generation value is calculated based upon a target generator torque filtered through a damping filter f and the generator 12 is controlled based upon the target power generation value. A target drive torque is set based upon the generator output and the generator inverter 13 is controlled based upon the target drive torque.

Figure 24:
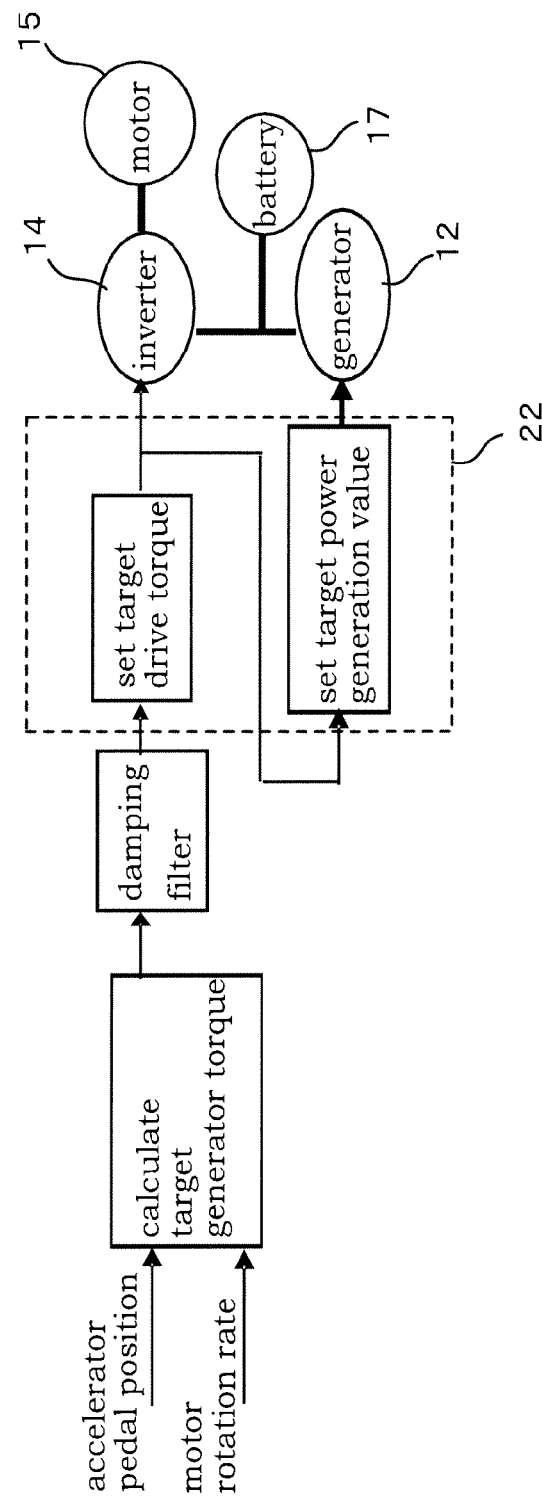
FIG. 24 is a block diagram presenting another example of arithmetic operations that may be executed in the generator controller shown in FIG. 5.
Figure 25:
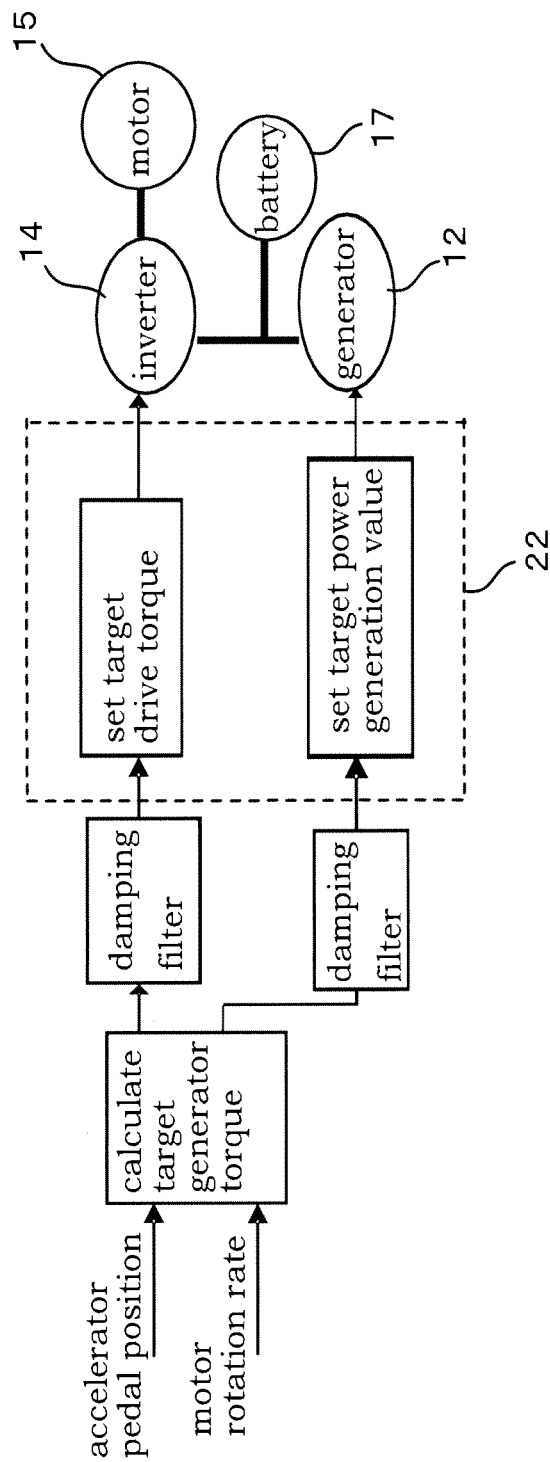
FIG. 25 is a block diagram presenting yet another example of arithmetic operations that may be executed in the generator controller shown in FIG. 5.

As an alternative, a target drive torque may be calculated based upon a target generator torque filtered through a damping filter f and then a target power generation value may be calculated based upon the target drive torque, as illustrated in FIG. 24. As a further alternative, a target drive torque and a target power generation value may be individually calculated based upon a target generator torque filtered through a damping filter f.

It is to be noted that the various blocks shown in the figures in reference to which the description has been given above are virtual functional units fulfilling the functions of the system controller 20 and do not represent physical entities.

It will be obvious that this invention is not limited to any of the particulars of the embodiments described above and that it allows for numerous variations without departing from the scope of its technical concept.

The disclosures of the following priority applications are herein incorporated by reference:
Japanese Patent Application No. 2009-124290 filed May 22, 2009
Japanese Patent Application No. 2010-27964 filed Feb. 10, 2010

The characteristics or features exclusive to the embodiments of this invention will be claimed as follows.

The invention claimed is:

1. A control device equipped with a programmable controller configured to execute control for an electric motor vehicle comprising:
 a drive motor that generates a drive torque to be transmitted to drive wheels; and
 a power supply source including at least a generator having an electric motor and providing power to the drive motor, wherein the programmable controller is programmed to
calculate a required drive torque based upon a traveling state of the vehicle,
calculate a power supply value representing power to be supplied from the power supply source to the drive motor,
perform damping processing for both of the required drive torque and the power generated by the generator to compensate for a delay time of the power supply source,
control the power supply source to supply to the drive motor power resulting from the damping processing so as to reduce a frequency component in the power generated by the generator, the frequency component being equivalent to a torsional vibration of a drive system of the vehicle,
calculate a drive torque to be indicated in a command issued to the drive motor based upon an output of the generator,
control the drive motor based upon the drive torque, and
control the power generated by the generator to be substantially equivalent to a target generation power value representing target power to be generated and supplied to the drive motor.

2. The control device for the electric motor vehicle as defined in claim 1, wherein:
the power supply source further includes a storage battery; and
the controller is further programmed to
designate a sum of power chargeable in the storage battery and the power supply value as a power generation command value, and control the generator based upon a value obtained by executing the damping processing on the power generation command value if the power supply value exceeds power that the storage battery is configured to supply to the drive motor;
calculate a target charge/discharge power value for the storage battery by subtracting a target generation power value representing target power to be generated and supplied to the drive motor from the power generation command value resulting from the damping processing, and execute the damping processing for the target charge/discharge power value; and
calculate a generator auxiliary drive power command value by subtracting the target charge/discharge power value resulting from the damping processing from power that is actually generated, and control the drive motor based upon the calculated value.

3. The control device for the electric motor vehicle as defined in claim 2, wherein the controller is further programmed to:
execute upper/lower limit processing for the power supply value based upon the actually generated power, and allowable output power output from and allowable input power input to the storage battery, and
designate a value obtained by applying an upper limit and a lower limit to a value, resulting from the upper/lower limit processing, based upon the target charge/discharge power value and the allowable output power and the allowable input power pertaining to the storage battery as a damping filter-applied drive power command value.

4. The control device for the electric motor vehicle as defined in claim 3, wherein the controller is further programmed to:
designate a sum of a value obtained by executing the damping processing for the damping filter-applied drive power command value and the generator auxiliary drive power command value as a drive power command value;
calculate a drive loss at the drive motor based upon the drive power command value, a rotating speed of the drive motor and a voltage at the storage battery; and
designate, as a drive motor torque command value, a value obtained by dividing a value representing a difference between the drive power command value and the drive loss by the rotating speed of the drive motor.

5. The control device for the electric motor vehicle as defined in claim 2, wherein the controller is further programmed to:
designate, as the target charge/discharge power value, a value obtained by applying an engine response delay filter and a damping filter to a value representing a difference between the power generation command value resulting from the damping processing and a target power generation value representing target power to be generated and supplied to the drive motor.

6. The control device for the electric motor vehicle as defined in claim 2, wherein the controller is further programmed to:
execute limit processing for the power supply value by designating a sum of the actually generated power and allowable output power that the storage battery is configured to output as an upper limit and by designating a value representing a difference between the actually generated power and power chargeable to the storage battery as a lower limit,
further apply limits to a value resulting from the limit processing by designating a sum of part of the actually generated power, which is allocated to charge the storage battery, and the allowable output power at the storage battery as an upper limit and designating a difference between part of the actually generated power, which is allocated to discharge the storage battery, and allowable input power at the storage battery as a lower limit, and
designate the value obtained by applying the limits as a damping filter-applied drive power command value.

7. The control device for the electric motor vehicle as defined in claim 1, wherein:
the programmable controller is configured to detect the traveling state via an accelerator pedal position sensor and a drive motor rotating speed sensor.

8. The control device for the electric motor vehicle as defined in claim 2, wherein:
the programmable controller is configured to detect the traveling state via an accelerator pedal position sensor, a drive motor rotating speed sensor and a sensor that detects a voltage at the storage battery.

9. A control device for an electric motor vehicle, comprising
a drive motor that generates a drive torque to be transmitted to drive wheels; and
a power supply source including at least a generator having an electric motor and providing power to the drive motor, the control device comprising:
a required drive torque calculation means for calculating a required drive torque based upon a traveling state of the vehicle;

a power supply value calculation means for calculating a power supply value indicating power to be supplied to the drive motor from the power supply source; and a power supply command means for
- performing damping processing for both of the required drive torque and the power generated by the generator to compensate for a delay time of the power supply source,
- controlling the power supply source so as to supply to the drive motor power resulting from the damping processing so as to reduce a frequency component in the power generated by the generator, the frequency component being equivalent to a torsional vibration of a drive system of the vehicle,
- calculating a drive torque to be indicated in a command to the drive motor based upon an output of the generator,
- controlling the drive motor based upon the drive torque, and
- controlling the power generated by the generator to be substantially equivalent to a target generation power value representing target power to be generated and supplied to the drive motor.

10. A control method for an electric motor vehicle comprising a drive motor that generates a drive torque to be transmitted to drive wheels and a power supply source including at least a generator having an electric motor and providing power to the drive motor, the control method comprising:
- calculating a required drive torque based upon a traveling state of the vehicle,
- calculating a power supply value indicating power to be supplied to the drive motor from the power supply source,
- performing damping processing for both of the required drive torque and the power generated by the generator to compensate for a delay time of the power supply source,
- controlling the power supply source so as to supply to the drive motor power resulting from the damping processing so as to reduce a frequency component in the power generated by the generator, the frequency component being equivalent to a torsional vibration of a drive system of the vehicle,
- calculating a drive torque to be indicated in a command to the drive motor based upon an output of the generator,
- controlling the drive motor based upon the drive torque, and
- controlling the power generated by the generator to be substantially equivalent to a target generation power value representing target power to be generated and supplied to the drive motor.

11. The control device of claim 1, wherein the damping processing is executed such that a drive power of the drive motor substantially matches the power generated by the generator.

12. The control device of claim 9, wherein the damping processing is executed such that a drive power of the drive motor substantially matches the power generated by the generator.

13. The control method of claim 10, wherein the damping processing is executed such that a drive power of the drive motor substantially matches the power generated by the generator.

* * * * *